United States Patent
Chai et al.

(10) Patent No.: US 12,200,770 B2
(45) Date of Patent: Jan. 14, 2025

(54) UPLINK BEAM MANAGEMENT METHOD AND APPARATUS

(71) Applicant: Huawei Technologies Co., Ltd., Shenzhen (CN)

(72) Inventors: Xiaomeng Chai, Shanghai (CN); Yiqun Wu, Shanghai (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 462 days.

(21) Appl. No.: 17/452,886

(22) Filed: Oct. 29, 2021

(65) Prior Publication Data
US 2022/0046716 A1    Feb. 10, 2022

Related U.S. Application Data

(63) Continuation of application No. PCT/CN2020/087889, filed on Apr. 29, 2020.

(30) Foreign Application Priority Data

Apr. 30, 2019  (CN) .......................... 201910361869.1

(51) Int. Cl.
  *H04W 74/0833* (2024.01)
  *H04B 7/06* (2006.01)
  (Continued)

(52) U.S. Cl.
  CPC ...... *H04W 74/0833* (2013.01); *H04B 7/0617* (2013.01); *H04B 7/0695* (2013.01);
  (Continued)

(58) Field of Classification Search
  None
  See application file for complete search history.

(56) References Cited

U.S. PATENT DOCUMENTS

2018/0206132 A1*  7/2018  Guo ..................... H04B 7/0695
2019/0097874 A1   3/2019  Zhou et al.
(Continued)

FOREIGN PATENT DOCUMENTS

CN        107223361 A      9/2017
CN        108141299 A      6/2018
(Continued)

OTHER PUBLICATIONS

Interdigital Communications, On UL Beam Management for NR:, 3GPP TSG RAN WG1 Meeting #88, R1-1702326, Athens, Greece, Feb. 13-17, 2017, 2 pages.
(Continued)

*Primary Examiner* — Jay L Vogel
(74) *Attorney, Agent, or Firm* — Slater Matsil, LLP

(57) ABSTRACT

A method includes: When user equipment is in an RRC idle mode or inactive mode, the user equipment sends a first random access preamble to an access network device on a PRACH resource, and sends first uplink data to the access network device on a PUSCH resource. The user equipment sends, by using at least two beams respectively, SRSs to the access network device on at least two SRS resources associated with the PUSCH resource. The user equipment receives a random access response from the access network device, where the random access response includes beam indication information, and the beam indication information is used to indicate an optimal beam in the at least two beams.

19 Claims, 15 Drawing Sheets

(51) Int. Cl.
| | |
|---|---|
| *H04B 7/08* | (2006.01) |
| *H04L 5/00* | (2006.01) |
| *H04W 72/044* | (2023.01) |
| *H04W 72/23* | (2023.01) |
| *H04W 74/00* | (2009.01) |
| *H04W 76/27* | (2018.01) |

(52) U.S. Cl.
CPC ........... *H04B 7/088* (2013.01); *H04L 5/0023* (2013.01); *H04L 5/0048* (2013.01); *H04W 72/046* (2013.01); *H04W 72/23* (2023.01); *H04W 74/006* (2013.01); *H04W 76/27* (2018.02)

(56) References Cited

U.S. PATENT DOCUMENTS

| | | | | |
|---|---|---|---|---|
| 2019/0159054 A1* | 5/2019 | Yiu | ........................ | H04B 7/063 |
| 2020/0120610 A1* | 4/2020 | Chen | ..................... | H04W 72/23 |
| 2020/0259619 A1* | 8/2020 | Iwai | ................... | H04W 74/0833 |
| 2020/0351801 A1* | 11/2020 | Jeon | ....................... | H04W 52/48 |
| 2020/0383141 A1* | 12/2020 | Lei | ...................... | H04W 56/001 |

FOREIGN PATENT DOCUMENTS

| | | | | |
|---|---|---|---|---|
| CN | 109152005 A | | 1/2019 | |
| CN | 109417822 A | | 3/2019 | |
| CN | 109429346 A | | 3/2019 | |
| CN | 109511155 A | | 3/2019 | |
| KR | 20140016371 A | * | 5/2011 | ........... H04B 17/391 |
| WO | WO-2014011004 A2 | * | 1/2014 | ........... H04L 5/0023 |
| WO | WO-2018030824 A1 | * | 2/2018 | ........... H04B 7/0695 |
| WO | WO-2018075256 A1 | * | 4/2018 | ........ H04W 72/0413 |
| WO | 2018139575 A1 | | 8/2018 | |

OTHER PUBLICATIONS

Samsung, "Corrections on UL Beam Management", 3GPP TSG RAN WG1 Meeting #92, R1-1801965, Athens, Greece, Feb. 26-Mar. 2, 2018, 6 pages.

Nokia et al., "On 2-step Random Access Procedure", 3GPP TSG RAN WG1 Ad-Hoc Meeting 1901, R1-1901192, Taipei, Taiwan, Jan. 21-25, 2019, 7 pages.

Huawei et al., "UL SRS design for beam management, CSI acquisition", 3GPP TSG RAN WG1 Meeting #89, R1-1706938, Hangzhou, China, May 15-29, 2017, 9 pages.

* cited by examiner

UPLINK BEAM MANAGEMENT METHOD AND APPARATUS

CROSS-REFERENCE TO RELATED APPLICATIONS

This application is a continuation of International Application No. PCT/CN2020/087889, filed on Apr. 29, 2020, which claims priority to Chinese Patent Application No. 201910361869.1, filed on Apr. 30, 2019. The disclosures of the aforementioned applications are hereby incorporated by reference in their entireties.

TECHNICAL FIELD

This application relates to the field of communication technologies, and in particular, to an uplink beam management method and an apparatus.

BACKGROUND

In a new radio (NR) communication system, to resist a path loss in a high-frequency scenario, beamforming is usually introduced to obtain a gain. A data channel, a control channel, a synchronization signal, a broadcast signal, and the like may all be sent by using a beam. Therefore, beam management is particularly important. The beam management refers to a process in which two communication parties align and obtain an optimal transmit beam and an optimal receive beam. The beam management is usually classified into uplink beam management and downlink beam management. The uplink beam management refers to management of a transmit beam on a user equipment side and a receive beam on a base station side. The downlink beam management refers to management of a transmit beam on a base station side and a receive beam on a user equipment side.

In a current technology, when user equipment is in a radio resource control (RRC) idle mode or inactive mode, a downlink beam management method on a base station side is provided. A specific method is that, a synchronization signal block (SSB) is enabled to be associated with a physical random access channel (PRACH) occasion and an index of a random access preamble that is in each PRACH occasion; a base station transmits an SSB through beam sweeping, the user equipment measures each SSB, selects an SSB with a relatively high signal strength, and performs random access by using a random access preamble corresponding to the selected SSB; and the base station obtains, by detecting the random access preamble, a downlink beam selected by the user equipment. In this way, downlink beam management on the base station side is completed. However, when the user equipment is in the RRC idle mode or inactive mode, how to implement uplink beam management on a user equipment side is still an urgent problem to be resolved.

SUMMARY

This application provides an uplink beam management method and an apparatus, to implement uplink beam management for user equipment in an RRC idle mode or inactive mode.

To achieve the foregoing objective, the following technical solutions are used in this application.

According to a first aspect, an uplink beam management method is provided. The method includes: When user equipment is in a radio resource control RRC idle mode or inactive mode, the user equipment sends a first random access preamble to an access network device on a physical random access channel PRACH resource, and sends first uplink data to the access network device on a physical uplink shared channel PUSCH resource; sends, by using at least two beams respectively, sounding reference signals SRSs to the access network device on at least two SRS resources associated with the PUSCH resource; and receives a random access response from the access network device, where the random access response includes beam indication information, and the beam indication information is used to indicate an optimal beam in the at least two beams. In the foregoing technical solution, when the user equipment is in the RRC idle mode or inactive mode, the user equipment may perform beam sweeping by using the at least two SRS resources associated with the PUSCH resource of random access, and the access network device may indicate the optimal beam by using the beam indication information in the random access response, so that uplink beam management for the user equipment in the RRC idle mode or inactive mode is implemented. In addition, instead of performing beam sweeping in any process, the user equipment performs beam sweeping by using the at least two SRS resources associated with the PUSCH resource of random access only when the user equipment performs random access. Therefore, power saving can be achieved. In addition, the user equipment sends the SRSs on the at least two SRS resources associated with the PUSCH resource only when the user equipment sends the first uplink data on the PUSCH resource. In this way, interference caused by the SRSs to another user equipment can be reduced.

In a possible implementation of the first aspect, the at least two SRS resources are located after the PUSCH resource in time domain, and a time domain distance between the PUSCH resource and the at least two SRS resources is less than or equal to a preset distance. In the foregoing possible implementation, the time domain distance between the PUSCH resource and the at least two SRS resources is less than or equal to the preset distance, so that it can be ensured that the access network device can determine the optimal beam before sending the random access response, and notify the user equipment by using the random access response. Therefore, a quantity of times of interaction between the user equipment and the access network device can be reduced, and signaling overheads can be reduced.

In a possible implementation of the first aspect, the beam indication information is a target SRS resource index, and the method further includes: determining, as the optimal beam, a beam corresponding to an SRS resource indicated by the target SRS resource index. In the foregoing possible implementation, a manner of indicating the optimal beam by using the target SRS resource index is simple and effective, and the target SRS resource index occupies only a few information bits in the random access response.

In a possible implementation of the first aspect, the method further includes: receiving configuration information from the access network device, where the configuration information is used to configure the at least two SRS resources. In the foregoing possible implementation, the access network device may configure the at least two SRS resources for the user equipment based on an actual situation. For example, the access network device configures the at least two SRS resources based on a requirement of the user equipment, a quantity of remaining resources, or the like, so that rationality of the configuration of the at least two SRS resources can be improved.

In a possible implementation of the first aspect, the configuration information includes at least one of the following information: a quantity of the at least two SRS resources, frequency domain indication information of each of the at least two SRS resources, time domain indication information of each of the at least two SRS resources, or an ID of an SRS sequence carried on each of the at least two SRS resources. In the foregoing possible implementation, the provided configuration information may enable the user equipment to determine, based on the configuration information, a time domain position and a frequency domain position that correspond to each SRS resource associated with the PUSCH resource of random access, and an SRS sequence sent on each SRS resource. In this way, the user equipment may send a corresponding SRS on a specified resource, and the access network device may also receive the corresponding SRS on the specified resource. Therefore, accuracy of receiving the SRS by the access network device can be improved, and power consumption for receiving the SRS by the access network device can be reduced.

In a possible implementation of the first aspect, Identities IDs of SRS sequences carried on the at least two SRS resources are determined based on the first random access preamble; or a resource element RE that is in the at least two SRS resources and that is used to send an SRS sequence is determined based on the first random access preamble. In the foregoing possible implementation, a relationship between the IDs of the SRS sequences carried on the at least two SRS resources and the first random access preamble, or a relationship between the first random access preamble and the RE that is in the at least two SRS resources and that is used to send the SRS sequence may be predefined. The user equipment may determine, based on predefined information, an SRS sequence on each SRS resource or an RE used to send the SRS sequence. In this way, interference can be further reduced.

In a possible implementation of the first aspect, the method further includes: The user equipment sends second uplink data to the access network device by using the optimal beam. In the foregoing possible implementation, the user equipment may directly send subsequent uplink data to the access network device by using the optimal beam, so that a beam gain of the subsequently transmitted uplink data can be increased.

According to a second aspect, an uplink beam management method is provided. The method includes: An access network device receives a first random access preamble sent on a physical random access channel PRACH resource and first uplink data sent on a physical uplink shared channel PUSCH resource, where the first random access preamble and the first uplink data are sent by user equipment when the user equipment is in a radio resource control RRC idle mode or inactive mode; receives SRSs on at least two sounding reference signal SRS resources associated with the PUSCH resource; determines an optimal beam of the user equipment based on the SRSs on the at least two SRS resources; and sends a random access response to the user equipment, where the random access response includes beam indication information, and the beam indication information is used to indicate the optimal beam. In the foregoing technical solution, when the user equipment is in the RRC idle mode or inactive mode, the user equipment may perform beam sweeping by using the at least two SRS resources associated with the PUSCH resource of random access, and the access network device may indicate the optimal beam by using the beam indication information in the random access response, so that uplink beam management for the user equipment in the RRC idle mode or inactive mode is implemented. In addition, instead of performing beam sweeping in any process, the user equipment performs beam sweeping by using the at least two SRS resources associated with the PUSCH resource of random access only when the user equipment performs random access. Therefore, power saving can be achieved. In addition, after sending the first uplink data on the PUSCH resource, the user equipment sends the SRSs on the at least two SRS resources associated with the PUSCH resource. In this way, interference caused by the SRSs to another user equipment can be reduced.

In a possible implementation of the second aspect, the at least two SRS resources are located after the PUSCH resource in time domain, and a time domain distance between the PUSCH resource and the at least two SRS resources is less than or equal to a preset distance. In the foregoing possible implementation, the time domain distance between the PUSCH resource and the at least two SRS resources is less than or equal to the preset distance, so that it can be ensured that the access network device can determine the optimal beam before sending the random access response, and notify the user equipment by using the random access response. Therefore, a quantity of times of interaction between the user equipment and the access network device can be reduced, and signaling overheads can be reduced.

In a possible implementation of the second aspect, the beam indication information is a target SRS resource index, and a beam corresponding to an SRS resource indicated by the target SRS resource index is the optimal beam. In the foregoing possible implementation, a manner of indicating the optimal beam by using the target SRS resource index is simple and effective, and the target SRS resource index occupies only a few information bits in the random access response.

In a possible implementation of the second aspect, that the access network device determines an optimal beam of the user equipment based on the SRSs on the at least two SRS resources includes: The access network device determines a received power of an SRS on each of the at least two SRS resources. The access network device determines, as the optimal beam, a beam corresponding to an SRS whose received power is greater than or equal to a preset power threshold, or the access network device determines, as the optimal beam, a beam corresponding to an SRS whose received power is the largest. In the foregoing possible implementation, the access network device may select an optimal beam based on the received power of the SRS on each SRS resource.

In a possible implementation of the second aspect, the method further includes: The access network device sends configuration information to the user equipment, where the configuration information is used to configure the at least two SRS resources. In the foregoing possible implementation, the access network device may configure the at least two SRS resources for the user equipment based on an actual situation. For example, the access network device configures the at least two SRS resources based on a requirement of the user equipment, a quantity of remaining resources, or the like, so that rationality of the configuration of the at least two SRS resources can be improved.

In a possible implementation of the second aspect, the configuration information includes at least one of the following information: a quantity of the at least two SRS resources, frequency domain indication information of each of the at least two SRS resources, time domain indication information of each of the at least two SRS resources, or an identity ID of an SRS sequence carried on each of the at least two SRS resources. In the foregoing possible implementation, the provided configuration information may enable the user equipment to determine, based on the configuration information, a time domain position and a frequency domain position that correspond to each SRS resource associated with the PUSCH resource of random access, and an SRS sequence sent on each SRS resource. In this way, the user equipment may send a corresponding SRS on a specified resource, and the access network device may also receive the corresponding SRS on the specified resource. Therefore, accuracy of receiving the SRS by the access network device can be improved, and power consumption for receiving the SRS by the access network device can be reduced.

In a possible implementation of the second aspect, the IDs of the SRS sequences carried on the at least two SRS resources are determined based on the first random access preamble; or a resource element RE that is in the at least two SRS resources and that is used to send an SRS sequence is determined based on the first random access preamble. In the foregoing possible implementation, a relationship between the IDs of the SRS sequences carried on the at least two SRS resources and the first random access preamble, or a relationship between the first random access preamble and the RE that is in the at least two SRS resources and that is used to send the SRS sequence may be predefined. The user equipment may determine, based on predefined information, an SRS sequence on each SRS resource or an RE used to send the SRS sequence. In this way, the quantity of times of interaction between the user equipment and the access network device can be reduced, and the signaling overheads can be reduced.

According to a third aspect, a communication apparatus is provided. The apparatus may be user equipment or a chip built in user equipment. The apparatus may implement a function in the method provided in any one of the first aspect or the possible implementations of the first aspect. The function may be implemented by hardware, or may be implemented by hardware executing corresponding software. The hardware or the software includes one or more modules corresponding to the foregoing function.

In a possible implementation of the third aspect, a structure of the apparatus includes a sending unit and a receiving unit. The sending unit and the receiving unit are configured to support communication between the apparatus and another network element (for example, an access network device). Further, the structure of the apparatus may further include a processing unit. The processing unit is configured to perform a processing function of the user equipment in the method provided in any one of the first aspect or the possible implementations of the first aspect.

In a possible implementation of the third aspect, a structure of the apparatus includes a processor and a memory. The memory is configured to be coupled to the processor, and stores program instructions and/or data that are/is necessary for the apparatus. The processor runs the program instructions, so that the apparatus performs a corresponding function in the method provided in any one of the first aspect or the possible implementations of the first aspect. Further, the apparatus may further include a communication interface. The communication interface is configured to support communication between the apparatus and another network element (for example, an access network device).

According to a fourth aspect, a communication apparatus is provided. The apparatus may be an access network device or a chip built in an access network device. The apparatus may implement a function in the method provided in any one of the second aspect or the possible implementations of the second aspect. The function may be implemented by hardware, or may be implemented by hardware executing corresponding software. The hardware or the software includes one or more modules corresponding to the foregoing function.

In a possible implementation of the fourth aspect, a structure of the apparatus includes a receiving unit, a processing unit, and a sending unit. The sending unit and the receiving unit are configured to support communication between the apparatus and another network element (for example, user equipment). The processing unit is configured to perform a processing function of the access network device in the method provided in any one of the second aspect or the possible implementations of the second aspect.

In a possible implementation of the fourth aspect, a structure of the apparatus includes a processor and a memory. The memory is configured to be coupled to the processor, and stores program instructions and/or data that are/is necessary for the apparatus. The processor runs the program instructions, so that the apparatus performs a corresponding function in the method provided in any one of the second aspect or the possible implementations of the second aspect. Further, the apparatus may further include a communication interface. The communication interface is configured to support communication between the apparatus and another network element (for example, user equipment).

According to a fifth aspect, a communication system is provided. The communication system includes user equipment and an access network device. The user equipment may be the communication apparatus provided in any one of the third aspect or the possible implementations of the third aspect, and is configured to perform the method provided in any one of the first aspect or the possible implementations of the first aspect. The access network device may be the communication apparatus provided in any one of the fourth aspect or the possible implementations of the fourth aspect, and is configured to perform the method provided in any one of the second aspect or the possible implementations of the second aspect.

According to a sixth aspect, an uplink beam management method is provided. The method includes: When user equipment is in a radio resource control RRC idle mode or inactive mode, the user equipment sends a first random access preamble to an access network device on a physical random access channel PRACH resource, and repeatedly sends first uplink data to the access network device on at least two physical uplink shared channel PUSCH resources by using at least two beams respectively; and receives a random access response from the access network device, where the random access response includes beam indication information, and the beam indication information is used to indicate an optimal beam in the at least two beams. In the foregoing technical solution, when the user equipment is in the RRC idle mode or inactive mode, the user equipment may perform beam sweeping by using the at least two PUSCH resources of random access, and the access network device may indicate the optimal beam by using the beam indication information in the random access response, so that uplink beam management for the user equipment in the RRC idle mode or inactive mode is implemented. In addition, instead of performing beam sweeping in any process, the user equipment performs beam sweeping by using the at least two PUSCH resources of random access only when the user equipment performs random access. Therefore, power saving can be achieved.

In a possible implementation of the sixth aspect, the beam indication information is a target PUSCH resource index or a target PUSCH repetition index (namely, an index of a transmission opportunity corresponding to a target PUSCH resource), and the method further includes: When the beam indication information is the target PUSCH resource index, the user equipment determines, as the optimal beam, a beam corresponding to a PUSCH resource indicated by the target PUSCH resource index. When the beam indication information includes the target PUSCH repetition index, the user equipment determines, as the optimal beam, a beam corresponding to a PUSCH repetition (namely, the transmission opportunity corresponding to the target PUSCH resource) indicated by the target PUSCH repetition index. In the foregoing possible implementation, a manner of indicating the optimal beam by using the target PUSCH resource index or the target PUSCH repetition index is simple and effective, and the target PUSCH resource index or the target PUSCH repetition index occupies only a small quantity of information bits in the random access response.

In a possible implementation of the sixth aspect, the method further includes: The user equipment receives configuration information from the access network device, where the configuration information is used to configure the at least two PUSCH resources. In the foregoing possible implementation, the access network device may configure the at least two PUSCH resources for the user equipment based on an actual situation. For example, the access network device configures the at least two PUSCH resources based on a requirement of the user equipment, a quantity of remaining resources, or the like, so that rationality of the configuration of the at least two PUSCH resources can be improved.

In a possible implementation of the sixth aspect, the configuration information includes at least one of the following information: a quantity of the at least two PUSCH resources, frequency domain indication information of each of the at least two PUSCH resources, or time domain indication information of each of the at least two PUSCH resources. In the foregoing possible implementation, the provided configuration information may enable the user equipment to determine, based on the configuration information, a time domain position and a frequency domain position that correspond to each PUSCH resource. In this way, the user equipment may repeatedly send the first uplink data on a specified resource, and the access network device may also receive the repeated first uplink data on the specified resource. Therefore, accuracy of receiving the repeated first uplink data by the access network device can be improved, and power consumption of the access network device can be reduced.

In a possible implementation of the sixth aspect, the method further includes: The user equipment sends second uplink data to the access network device by using the optimal beam. In the foregoing possible implementation, the user equipment may directly send subsequent uplink data to the access network device by using the optimal beam, so that a beam gain of the subsequently transmitted uplink data can be increased.

According to a seventh aspect, an uplink beam management method is provided. The method includes: An access network device receives a first random access preamble sent on a physical random access channel PRACH resource and first uplink data repeatedly sent on at least two physical uplink shared channel PUSCH resources, where the first random access preamble and the first uplink data are sent by user equipment when the user equipment is in a radio resource control RRC idle mode or inactive mode. The access network device determines an optimal beam of the user equipment based on the first uplink data on the at least two PUSCH resources. The access network device sends a random access response to the user equipment, where the random access response includes beam indication information, and the beam indication information is used to indicate the optimal beam. In the foregoing technical solution, when the user equipment is in the RRC idle mode or inactive mode, the user equipment may perform beam sweeping by using the at least two PUSCH resources of random access, and the access network device may indicate the optimal beam by using the beam indication information in the random access response, so that uplink beam management for the user equipment in the RRC idle mode or inactive mode is implemented. In addition, instead of performing beam sweeping in any process, the user equipment performs beam sweeping by using the at least two PUSCH resources of random access only when the user equipment performs random access. Therefore, power saving can be achieved.

In a possible implementation of the seventh aspect, the beam indication information is a target PUSCH resource index, and a beam corresponding to a PUSCH resource indicated by the target PUSCH resource index is the optimal beam; or the beam indication information is a target PUSCH repetition index, and a beam corresponding to first uplink data indicated by the target PUSCH repetition index is the optimal beam. In the foregoing possible implementation, a manner of indicating the optimal beam by using the target PUSCH resource index or the target PUSCH repetition index is simple and effective, and the target PUSCH resource index or the target PUSCH repetition index occupies only a small quantity of information bits in the random access response.

In a possible implementation of the seventh aspect, the method further includes: The access network device determines a received power of first uplink data on each of the at least two PUSCH resources. The access network device determines, as the optimal beam, a beam corresponding to a first uplink signal whose received power is greater than or equal to a preset power threshold (where the first uplink signal is an uplink signal corresponding to the first uplink data), or the access network device determines, as the optimal beam, a beam corresponding to a first uplink signal whose received power is the largest. In the foregoing possible implementation, the access network device may select an optimal beam based on the received power of the first uplink data on each PUSCH resource.

In a possible implementation of the seventh aspect, the method further includes: The access network device sends configuration information to the user equipment, where the configuration information is used to configure the at least two PUSCH resources. In the foregoing possible implementation, the access network device may configure the at least two PUSCH resources for the user equipment based on an actual situation. For example, the access network device configures the at least two PUSCH resources based on a requirement of the user equipment, a quantity of remaining resources, or the like, so that rationality of the configuration of the at least two PUSCH resources can be improved.

In a possible implementation of the seventh aspect, the configuration information includes at least one of the following information: a quantity of the at least two PUSCH resources, frequency domain indication information of each of the at least two PUSCH resources, or time domain indication information of each of the at least two PUSCH resources. In the foregoing possible implementation, the provided configuration information may enable the user equipment to determine, based on the configuration information, a time domain position and a frequency domain position that correspond to each PUSCH resource. In this way, the user equipment may repeatedly send the first uplink data on a specified resource, and the access network device may also receive the repeated first uplink data on the specified resource. Therefore, accuracy of receiving the repeated first uplink data by the access network device can be improved, and power consumption of the access network device can be reduced.

According to an eighth aspect, a communication apparatus is provided. The apparatus may be user equipment or a chip built in user equipment. The apparatus may implement a function in the method provided in any one of the sixth aspect or the possible implementations of the sixth aspect. The function may be implemented by hardware, or may be implemented by hardware executing corresponding software. The hardware or the software includes one or more modules corresponding to the foregoing function.

In a possible implementation of the eighth aspect, the apparatus includes: a sending unit, configured to: when the apparatus is in a radio resource control RRC idle mode or inactive mode, send a first random access preamble to an access network device on a physical random access channel PRACH resource, and repeatedly send first uplink data to the access network device on at least two physical uplink shared channel PUSCH resources by using at least two beams respectively; and a receiving unit, configured to receive a random access response from the access network device, where the random access response includes beam indication information, and the beam indication information is used to indicate an optimal beam in the at least two beams.

In a possible implementation of the eighth aspect, the beam indication information is a target PUSCH resource index or a target PUSCH repetition index, and the apparatus further includes a processing unit. The processing unit is configured to: when the beam indication information is the target PUSCH resource index, determine, as the optimal beam, a beam corresponding to a PUSCH resource indicated by the target PUSCH resource index; or when the beam indication information includes the target PUSCH repetition index, determine, as the optimal beam, a beam corresponding to a PUSCH repetition indicated by the target PUSCH repetition index.

In a possible implementation of the eighth aspect, the receiving unit is further configured to receive configuration information from the access network device, where the configuration information is used to configure the at least two PUSCH resources.

In a possible implementation of the eighth aspect, the configuration information includes at least one of the following information: a quantity of the at least two PUSCH resources, frequency domain indication information of each of the at least two PUSCH resources, or time domain indication information of each of the at least two PUSCH resources.

In a possible implementation of the eighth aspect, the sending unit is further configured to send second uplink data to the access network device by using the optimal beam.

In another possible implementation of the eighth aspect, a structure of the apparatus includes a processor and a memory. The processor is configured to run instructions or a computer program in the memory, so that the apparatus performs a corresponding function in the method provided in any one of the sixth aspect or the possible implementations of the sixth aspect. Further, the apparatus may further include a communication interface. The communication interface is configured to support communication between the apparatus and another device.

According to a ninth aspect, a communication apparatus is provided. The apparatus may be an access network device or a chip built in an access network device. The apparatus may implement a function in the method provided in any one of the seventh aspect or the possible implementations of the seventh aspect. The function may be implemented by hardware, or may be implemented by hardware executing corresponding software. The hardware or the software includes one or more modules corresponding to the foregoing function.

In a possible implementation of the ninth aspect, the apparatus includes: a receiving unit, configured to receive a first random access preamble sent on a physical random access channel PRACH resource and first uplink data repeatedly sent on at least two physical uplink shared channel PUSCH resources, where the first random access preamble and the first uplink data are sent by user equipment when the user equipment is in a radio resource control RRC idle mode or inactive mode; a processing unit, configured to determine an optimal beam of the user equipment based on the first uplink data on the at least two PUSCH resources; and a sending unit, configured to send a random access response to the user equipment, where the random access response includes beam indication information, and the beam indication information is used to indicate the optimal beam.

In a possible implementation of the ninth aspect, the beam indication information is a target PUSCH resource index, and a beam corresponding to a PUSCH resource indicated by the target PUSCH resource index is the optimal beam; or the beam indication information is a target PUSCH repetition index (namely, an index of a transmission opportunity corresponding to a target PUSCH resource), and a beam corresponding to a PUSCH repetition (namely, the transmission opportunity corresponding to the target PUSCH resource) indicated by the target PUSCH repetition index is the optimal beam.

In a possible implementation of the ninth aspect, the processing unit is further configured to: determine a received power of a first uplink signal on each of the at least two PUSCH resources (where the first uplink signal is an uplink signal corresponding to the first uplink data); and determine, as the optimal beam, a beam corresponding to a first uplink signal whose received power is greater than or equal to a preset power threshold, or determine, as the optimal beam, a beam corresponding to a first uplink signal whose received power is the largest.

In a possible implementation of the ninth aspect, the sending unit is further configured to send configuration information to the user equipment, where the configuration information is used to configure the at least two PUSCH resources.

In a possible implementation of the ninth aspect, the configuration information includes at least one of the following information: a quantity of the at least two PUSCH resources, frequency domain indication information of each of the at least two PUSCH resources, or time domain indication information of each of the at least two PUSCH resources.

In another possible implementation of the ninth aspect, a structure of the apparatus includes a processor and a memory. The processor is configured to run instructions or a computer program in the memory, so that the apparatus performs a corresponding function in the method provided in any one of the seventh aspect or the possible implementations of the seventh aspect. Further, the apparatus may further include a communication interface. The communication interface is configured to support communication between the apparatus and another device.

According to a tenth aspect, a communication system is provided. The communication system includes user equipment and an access network device. The user equipment may be the communication apparatus provided in any one of the eighth aspect or the possible implementations of the eighth aspect, and is configured to perform the method provided in any one of the sixth aspect or the possible implementations of the sixth aspect. The access network device may be the communication apparatus provided in any one of the ninth aspect or the possible implementations of the ninth aspect, and is configured to perform the method provided in any one of the seventh aspect or the possible implementations of the seventh aspect.

According to another aspect of this application, a computer-readable storage medium is provided. The computer-readable storage medium stores instructions, and when the instructions are run on a device, the device is enabled to perform the method according to any one of the first aspect or the possible implementations of the first aspect.

According to another aspect of this application, a computer-readable storage medium is provided. The computer-readable storage medium stores instructions, and when the instructions are run on a device, the device is enabled to perform the method according to any one of the second aspect or the possible implementations of the second aspect.

According to another aspect of this application, a computer program product is provided. When the computer program product runs on a device, the device is enabled to perform the method according to any one of the first aspect or the possible implementations of the first aspect.

According to another aspect of this application, a computer program product is provided. When the computer program product runs on a device, the device is enabled to perform the method according to any one of the second aspect or the possible implementations of the second aspect.

According to another aspect of this application, a computer-readable storage medium is provided. The computer-readable storage medium stores instructions, and when the instructions are run on a device, the device is enabled to perform the method according to any one of the sixth aspect or the possible implementations of the sixth aspect.

According to another aspect of this application, a computer-readable storage medium is provided. The computer-readable storage medium stores instructions, and when the instructions are run on a device, the device is enabled to perform the method according to any one of the seventh aspect or the possible implementations of the seventh aspect.

According to another aspect of this application, a computer program product is provided. When the computer program product runs on a device, the device is enabled to perform the method according to any one of the sixth aspect or the possible implementations of the sixth aspect.

According to another aspect of this application, a computer program product is provided. When the computer program product runs on a device, the device is enabled to perform the method according to any one of the seventh aspect or the possible implementations of the seventh aspect.

It may be understood that any communication apparatus, communication system, computer-readable storage medium, or computer program product provided above is configured to perform a corresponding method provided above. Therefore, for beneficial effects of the communication apparatus, communication system, computer-readable storage medium, or computer program product, refer to beneficial effects in the corresponding method provided above. Details are not described herein again.

DETAILED DESCRIPTION OF ILLUSTRATIVE EMBODIMENTS

Figure 1:
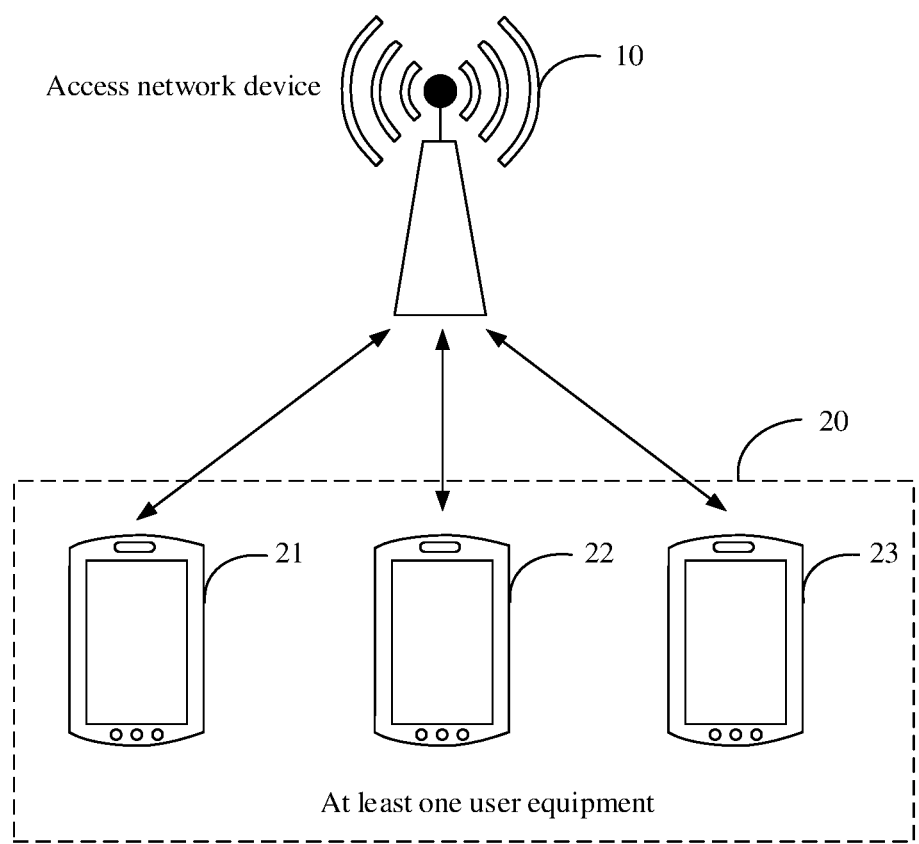
FIG. 1 is a schematic diagram of a structure of a communication system according to an embodiment of this application.

In this application, "at least one" means one or more, and "a plurality of" means two or more. The term "and/or"

describes an association relationship between associated objects and may indicate three relationships. For example, A and/or B may indicate the following cases: Only A exists; both A and B exists, where A and B may be singular or plural. The character "/" generally indicates an "or" relationship between the associated objects. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, in the embodiments of this application, terms such as "first" and "second" are used to distinguish between same objects or similar objects whose functions and purposes are basically the same. For example, a first threshold and a second threshold are merely intended to distinguish between different thresholds, and do not limit a sequence of the first threshold and the second threshold. A person skilled in the art may understand that the terms such as "first" and "second" do not constitute a limitation on a quantity or an execution sequence.

It should be noted that, in this application, the term such as "example" or "for example" is used to represent giving an example, an illustration, or descriptions. Any embodiment or design described as an "example" or "for example" in this application should not be explained as being more preferred or having more advantages than another embodiment or design. Specifically, use of "example" or "for example" is intended to present a relative concept in a specific manner.

The technical solutions in this application may be used for various communication systems, for example, a long time evolution (LTE) system, an LTE frequency division duplex (FDD) system, an LTE time division duplex (TDD) system, a universal mobile telecommunication system (UMTS), a worldwide interoperability for microwave access (WiMAX) communication system, a public land mobile network (PLMN) system, and a future 5G communication system. The technical solutions in this application may include a plurality of application scenarios, for example, machine to machine (M2M), device to machine (D2M), device to device (D2D), macro-micro communication, enhanced mobile broadband (eMBB), ultra-reliable and low-latency communications (uRLLC), and massive machine-type communications (mMTC).

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems. The embodiments of this application are described by using an example in which a provided method is used for a new radio (NR) system or a 5G network.

FIG. 1 is a schematic diagram of a structure of a communication system according to an embodiment of this application. Refer to FIG. 1. The communication system includes an access network device 10, and at least one user equipment (UE) 20. The access network device 10 may communicate with the at least one user equipment 20. In FIG. 1, an example in which the at least one user equipment 20 includes user equipment 21, user equipment 22, and user equipment 23 is used for description.

The access network device 10 has a function of scheduling a shared channel, and has a function of establishing scheduling based on a history of packet data sent to the at least one user equipment 20. The scheduling means that when the at least one user equipment 20 shares a transmission resource, a mechanism is required to effectively allocate a physical layer resource, to obtain a statistical multiplexing gain. The at least one user equipment 20 has a function of sending and receiving data by establishing a communication channel to the access network device 10. The at least one user equipment 20 sends or receives a shared channel based on information sent through a scheduling control channel.

In addition, data receiving and sending are performed between the access network device 10 and the at least one user equipment 20 through the communication channel. The communication channel may be a radio communication channel, and at least a shared channel and a scheduling control channel exist in the radio communication channel. To send and receive a packet, the shared channel is publicly used by the at least one user equipment 20. The scheduling control channel is used to send an allocation result of the shared channel, a corresponding scheduling result, and the like.

It should be noted that the communication system shown in FIG. 1 may further include a core network. The access network device 10 may be connected to the core network. The core network may be a 4G core network (for example, an evolved packet core (EPC)), a 5G core (5GC), or a core network in various future communication systems.

An example in which the core network may be a 4G core network is used. The access network device 10 may be an evolved NodeB (eNB or eNodeB) in a 4G system. The at least one user equipment 20 is user equipment that can perform information transmission with the eNB. The eNB accesses the EPC network through an S1 interface.

An example in which the core network may be a 5G core network is used. The access network device 10 may be a next generation NodeB (gNB) in an NR system, and the at least one user equipment 20 is user equipment that can perform information transmission with the gNB. The gNB accesses the 5GC through an NG interface.

Certainly, the access network device 10 may alternatively be a 3rd generation partnership project (3GPP) protocol base station, or may be a non-3GPP protocol base station.

In this embodiment of this application, the access network device 10 is an entity that may be configured to transmit or receive a signal and that is used in cooperation with the at least one user equipment 20. For example, the access network device 10 may be an access point (AP) in a WLAN, or may be an evolved NodeB (eNB or eNodeB) in an LTE system, a relay station, an access point, a vehicle-mounted device, a wearable device, an access network device in a future 5G network, an access network device in a future evolved PLMN network, or the like.

In addition, the access network device 10 provides a service for a cell, and the at least one user equipment 20 communicates with the access network device 10 by using a transmission resource (for example, a time domain resource, a frequency domain resource, or a time-frequency resource) used by the cell. The cell may be a cell corresponding to the access network device 10 (for example, a base station). The cell may belong to a macro base station, or may belong to a base station corresponding to a small cell. The small cell herein may include a metro cell, a micro cell, a pico cell, a femto cell, or the like. These small cells are characterized by small coverage and a low transmit power, and are applicable to providing a high-rate data transmission service.

In this embodiment of this application, the at least one user equipment 20 may be a device having a wireless communication function, and may be deployed on land, including indoor, outdoor, handheld, or vehicle-mounted. Alternatively, the user equipment 20 may be deployed on water (for example, on a ship), or may be deployed in the air (for example, on an airplane, a balloon, or a satellite). The user equipment may also be referred to as a mobile station (MS), a terminal, a mobile terminal (MT), a terminal device, or the like, and is a device that provides voice and/or data connectivity for a user. For example, the user equipment includes a handheld device, a vehicle-mounted device, or the like that has a wireless connection function. Currently, the user equipment may be a mobile phone, a tablet, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, wireless user equipment in industrial control, a smart home device (for example, a refrigerator, a television, an air conditioner, or an electricity meter), an intelligent robot, a workshop device, wireless user equipment in self-driving, wireless user equipment in remote medical surgery, wireless user equipment in a smart grid, wireless user equipment in transportation safety, wireless user equipment in a smart city, wireless user equipment in a smart home, a flight device (for example, an intelligent robot, a hot balloon, an unmanned aerial vehicle, or an aircraft), or the like. In a possible application scenario of this application, the user equipment is user equipment that often operates on land, for example, a vehicle-mounted device. In this application, for ease of description, a chip deployed in the foregoing device, for example, a system-on-a-chip (SOC), a baseband chip, or another chip having a communication function, may also be referred to as user equipment.

For example, in this embodiment of this application, the at least one user equipment 20 may further include a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smartwatches or smart glasses, and devices that focus on only one type of application and need to work with other devices such as smartphones, such as various smart bands or smart jewelry for monitoring physical signs.

In a communication system such as LTE, 5G, or NR, user equipment needs to enter a radio resource control (RRC) connected mode from an RRC idle mode or inactive mode by using a random access process. Then, the user equipment can establish various bearers with an access network device, obtain corresponding resources, parameter configurations, and the like, and communicate with the access network device based on obtained resources and parameters. The random access process may include a four-step random access process and a two-step random access process. The following respectively describes the four-step random access process and the two-step random access process by using FIG. 2 and FIG. 3.

Figure 2:
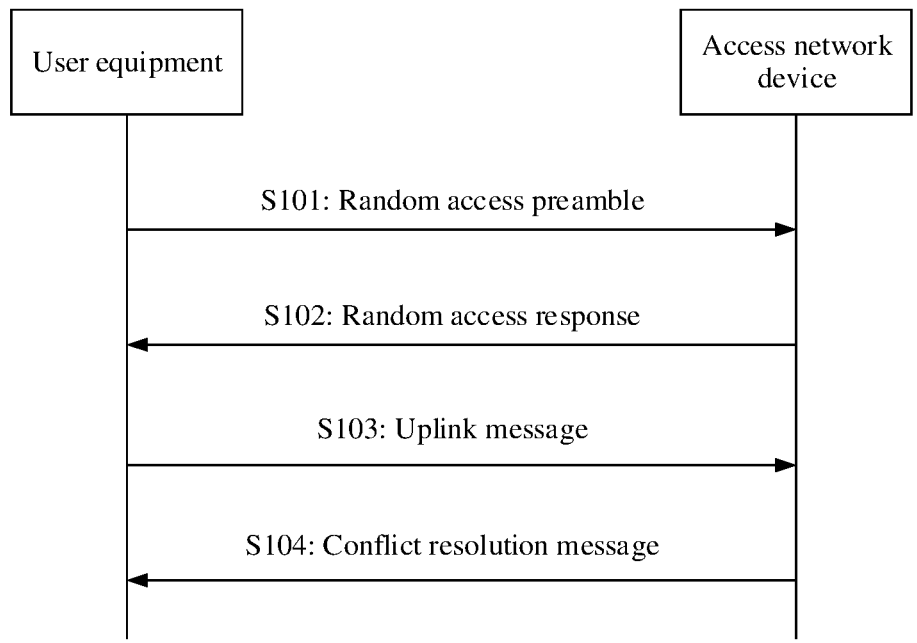
FIG. 2 is a schematic flowchart of four-step random access according to an embodiment of this application.

Refer to FIG. 2. A four-step random access process may include the following steps: S101: User equipment sends a random access preamble to an access network device, where a function of the random access preamble may be to notify the access network device that there is a random access request, and enable the access network device to estimate a transmission latency between the access network device and the user equipment, so that the access network device calibrates an uplink timing and notifies the user equipment of calibration information by using a timing advance command. S102: The access network device sends a random access response to the user equipment after detecting the random access preamble, where the random access response may include one or more of a sequence number of the random access preamble in S101, the timing advance command, uplink resource allocation information, and a cell radio network temporary identifier. S103: When the user equipment receives the random access response, if a random access preamble indicated by a sequence number of a random access preamble in the random access response is the same as the random access preamble in S101, the user equipment may determine that the random access response is a random access response for the user equipment, that is, the user equipment receives the random access response of the user equipment, and after the user equipment receives the random access response, the user equipment may send an uplink message on an allocated uplink resource based on an indication of the random access response. For example, the uplink message may be a physical uplink shared channel (PUSCH). S104: When receiving the uplink message of the user equipment, the access network device returns a conflict resolution message to the user equipment (user equipment that successfully performs access), where the conflict resolution message may carry an identifier of the user equipment that successfully performs access, and another user equipment that fails to successfully perform access may re-initiate a random access process.

Figure 3:
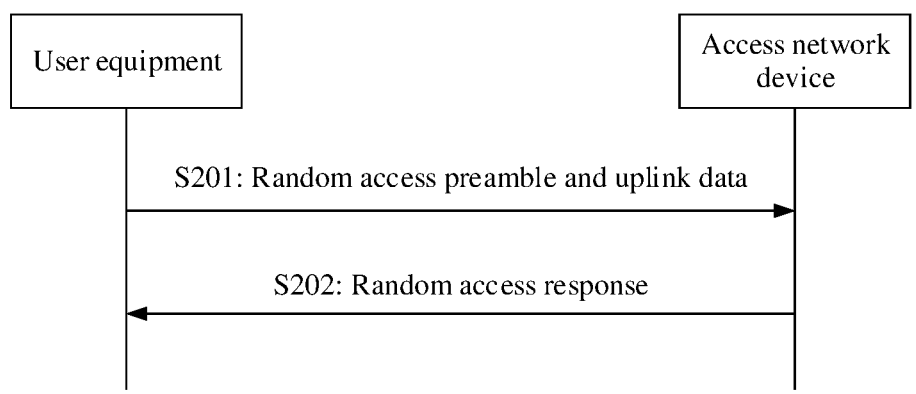
FIG. 3 is a schematic flowchart of two-step random access according to an embodiment of this application.

Refer to FIG. 3. A two-step random access process may include the following steps: S201: User equipment sends a first message to an access network device, where the first message includes a random access preamble and uplink data, the random access preamble is transmitted on a physical random access channel (PRACH), and the uplink data is transmitted on a PUSCH. S202: When the access network device receives the random access preamble and the uplink data, the access network device sends a random access response, which may also be referred to as a second message, to the user equipment.

It can be learned from FIG. 2 and FIG. 3 that a difference between the two-step random access process and the four-step random access process lies in that, in the two-step random access process, the first message sent by the user equipment to the access network device not only includes the random access preamble, but also includes the uplink data, that is, the user equipment sends the uplink data before completing uplink synchronization, so that an uplink data transmission latency can be reduced. In addition, compared with the four-step random access process, in the two-step random access process, the second message sent by the access network device to the user equipment does not need to include scheduling information that is of the uplink data and that is sent to the user equipment, so that signaling overheads can be reduced.

Figure 4:
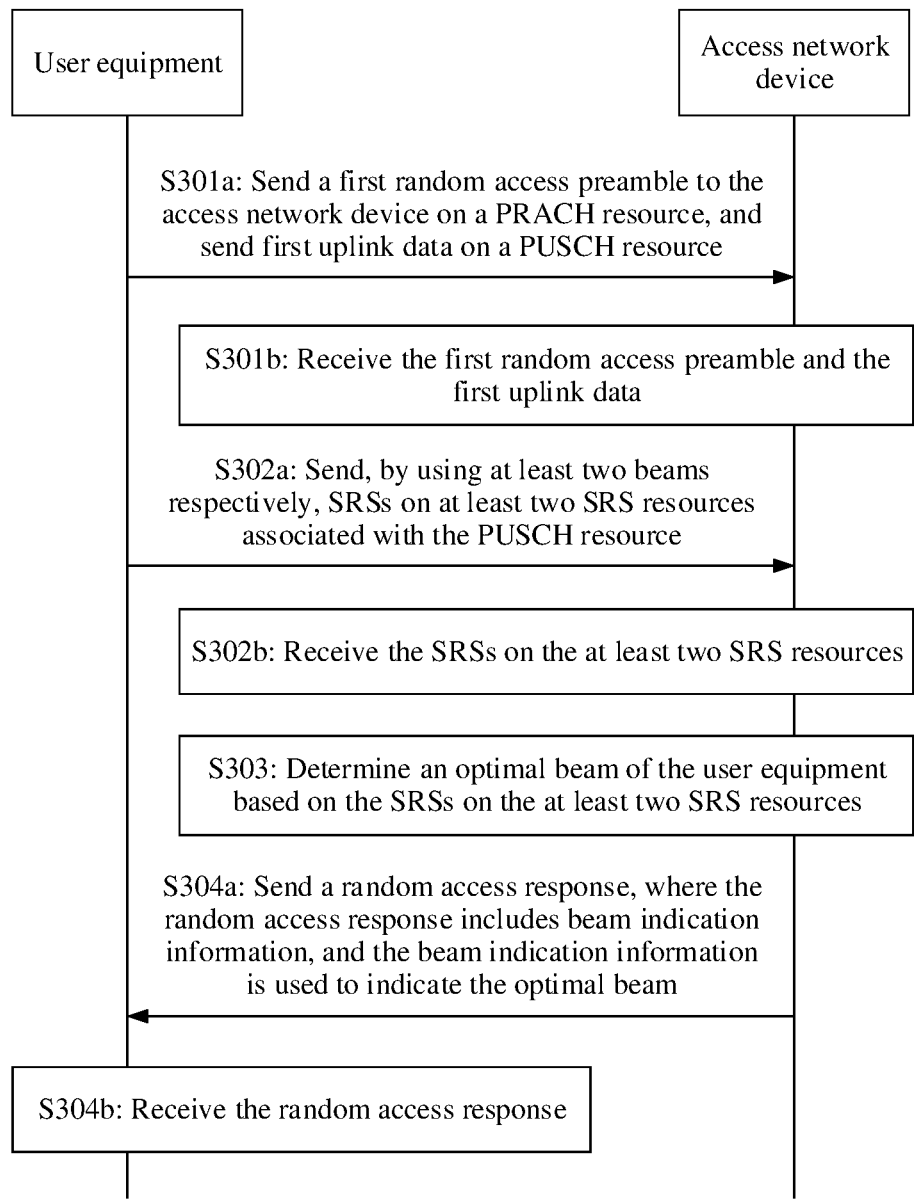
FIG. 4 is a schematic flowchart 1 of an uplink beam management method according to an embodiment of this application.

Based on the foregoing two-step random access process, the embodiments of this application provide two uplink beam management solutions, to implement uplink beam management on a user equipment side when the user equipment is in an RRC idle mode or inactive mode. Details are as follows:

FIG. 4 is a schematic flowchart of an uplink beam management method according to an embodiment of this application. The method may be used in the communication system shown in FIG. 1. Refer to FIG. 4. The method includes the following steps.

S301*a*: When user equipment is in an RRC idle mode or inactive mode, the user equipment sends a first random access preamble to an access network device on a PRACH resource, and sends first uplink data to the access network device on a PUSCH resource.

That the user equipment is in the RRC idle mode may mean that no dedicated bearer is established between the user equipment and the access network device, and the user equipment does not store an access stratum context. That the user equipment is in the inactive mode may mean that no dedicated bearer is established between the user equipment and the access network device, but the user equipment stores an access stratum context. When the user equipment is in the RRC idle mode or inactive mode, the user equipment may establish a dedicated bearer with the access network device by using a random access process. The dedicated bearer may be used to perform transmission of unicast data between the user equipment and the access network device.

In addition, the PRACH resource may include a time domain resource and a frequency domain resource that are occupied by a PRACH, and the PUSCH resource may include a time domain resource and a frequency domain resource that are occupied by a PUSCH. For example, the time domain resource may include a plurality of OFDM symbols, and the frequency domain resource may include a plurality of subcarriers. The PRACH resource and the PUSCH resource may be configured by the access network device for the user equipment.

Specifically, when the user equipment is in the RRC idle mode or inactive mode, the user equipment may use a wide beam to send the first random access preamble to the access network device on the PRACH resource, and send the first uplink data on the PUSCH resource. The first random access preamble and the first uplink data may be sent through one message, to be specific, the first random access preamble and the first uplink data may be sent through a first message in a two-step random access process.

S301*b*: The access network device receives the first random access preamble on the PRACH resource, and receives the first uplink data on the PUSCH resource.

The PRACH resource and the PUSCH resource may be resources configured by the access network device for the user equipment. When the user equipment sends the first random access preamble and the first uplink data, the access network device may receive the first random access preamble on the PRACH resource, and receive the first uplink data on the PUSCH resource. When the first random access preamble and the first uplink data are sent through the first message in the two-step random access process, the access network device may receive the first message including the first random access preamble and the first uplink data.

S302*a*: The user equipment sends, by using at least two beams respectively, SRSs to the access network device on at least two SRS resources associated with the PUSCH resource.

The at least two beams may include two or more narrow beams. A narrow beam is relative to a wide beam, and a width of the narrow beam may be less than a width of the wide beam. The at least two beams may be transmit beams of the user equipment, to be specific, the at least two beams are beams used by a user to perform uplink transmission, and may also be referred to as uplink beams. A sounding reference signal (SRS) is an uplink reference signal, and may be used for channel quality estimation. An SRS resource may be a resource used for transmission of an SRS. The at least two SRS resources may include two or more SRS resources, and each SRS resource may include a time domain resource and a frequency domain resource.

Figure 5:
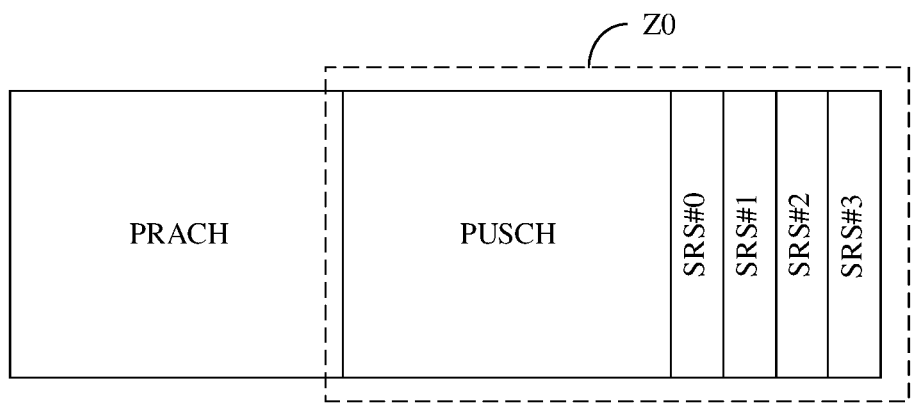
FIG. 5 is a schematic diagram 1 of a resource according to an embodiment of this application.

In addition, the at least two SRS resources associated with the PUSCH resource may be located after the PUSCH resource in time domain, and a time domain distance between the PUSCH resource and the at least two SRS resources associated with the PUSCH resource is less than or equal to a preset distance. For example, the PUSCH resource and the at least two SRS resources associated with the PUSCH resource may belong to a same resource area. The resource area may be an available resource that is configured by the access network device for the user equipment and that is used to send the first uplink data. The PUSCH resource may be a resource that is in the available resource and that is actually used to send the first uplink data. For example, as shown in FIG. 5, an example in which the time domain distance between the PUSCH resource and the at least two SRS resources associated with the PUSCH resource is zero is used. In this case, the resource area may be an area represented by Z0 in FIG. 5, the PUSCH resource may be an area represented by PUSCH, and the at least two SRS resources may be areas represented by SRS #0 to SRS #3. In FIG. 5, an example in which the at least two SRS resources include the four SRS resources is used for description. FIG. 5 further shows the PRACH resource, and PRACH is used to represent the PRACH resource.

It should be noted that the preset distance may be configured in advance. A specific value of the preset distance is not limited in this embodiment of this application, provided that the access network device can determine an optimal beam before S304 in the following.

Specifically, the user equipment may send, by using the at least two beams, through beam sweeping, the SRSs to the access network device on the at least two SRS resources associated with the PUSCH resource. For example, if the at least two beams include a beam a and a beam b, and the at least two SRS resources include SRS #0 and SRS #1, the user equipment may send a first SRS on SRS #0 by using the beam a, and send a second SRS on SRS #1 by using the beam b.

S302*b*: The access network device receives the SRSs on the at least two SRS resources associated with the PUSCH resource.

When the user equipment may send, through beam sweeping, the SRSs on the at least two SRS resources associated with the PUSCH, the access network device may receive the SRSs on the at least two SRS resources associated with the PUSCH resource. For example, when the user equipment sends the first SRS on SRS #0 by using the beam a, and sends the second SRS on SRS #01 by using the beam b, the access network device may receive the first SRS on SRS #0, and receive the second SRS on SRS #1.

S303: The access network device determines the optimal beam of the user equipment based on the SRSs on the at least two SRS resources.

When the access network device receives the SRSs on the at least two SRS resources, the access network device may determine a received power of an SRS on each of the at least two SRS resources, where the received power may also be referred to as a reference signal received power (RSRP), and determine, as the optimal beam, a beam corresponding to an SRS whose received power is greater than or equal to a preset power threshold, or determine, as the optimal beam, a beam corresponding to an SRS whose received power is the largest.

Optionally, when there are a plurality of SRSs whose received powers are greater than or equal to the preset power threshold, the access network device may select, as the optimal beam, a beam corresponding to any SRS in the plurality of SRSs, or select, as the optimal beam, a beam corresponding to an SRS whose received power has a largest value in the plurality of SRSs. For example, the SRSs on the at least two SRS resources include the first SRS and the second SRS, a received power of the first SRS is greater than a received power of the second SRS, and both are greater than the preset power threshold. In this case, the access network device may select, as the optimal beam, the beam a corresponding to the first SRS.

It should be noted that the preset power threshold may be preset by a person skilled in the art based on an actual requirement or experience. A specific value of the preset power threshold is not specifically limited in this embodiment of this application. In addition, as an alternative to selecting the optimal beam based on the received powers of the received SRSs, the access network device may select the optimal beam based on another parameter of the received SRSs, for example, signal strengths of the SRSs. This is not specifically limited in this embodiment of this application.

S304a: The access network device sends a random access response to the user equipment, where the random access response includes beam indication information, and the beam indication information is used to indicate the optimal beam.

When the access network device determines the optimal beam, the access network device may include the beam indication information in the random access response. In other words, the access network device may include the beam indication information in a second message in the two-step random access process, to notify the user equipment of the optimal beam by using the beam indication information. Optionally, the beam indication information may be a target SRS resource index, and a beam corresponding to an SRS resource indicated by the target SRS resource index is the optimal beam. An SRS on the SRS resource indicated by the target SRS resource index may be an SRS selected by the access network device based on the received power, that is, the received power of the selected SRS is the largest, or the received power of the selected SRS is greater than or equal to the preset power threshold.

For example, the user equipment sends the first SRS on SRS #0 by using the beam a, and sends the second SRS on SRS #1 by using the beam b, where the received power of the first SRS is greater than the received power of the second SRS, and both are greater than the preset power threshold. In this case, the access network device may select, as the target SRS resource index, an index of SRS #0 for sending the first SRS, and the target SRS resource index may be an identifier of SRS #0.

For another example, the user equipment sends the first SRS on SRS #0 by using the beam a, and sends the second SRS on SRS #1 by using the beam b, where the received power of the first SRS is greater than the received power of the second SRS. In this case, the access network device may select, as the target SRS resource index, an index of SRS #0 for sending the first SRS, and the target SRS resource index may be an identifier of SRS #0.

S304b: The user equipment receives the random access response from the access network device, where the random access response includes the beam indication information, and the beam indication information is used to indicate the optimal beam.

When the user equipment receives the random access response, the user equipment may determine the optimal beam in the at least two beams based on the beam indication information in the random access response. Optionally, when the beam indication information is the target SRS resource index, the user equipment may determine, as the optimal beam, the beam corresponding to the SRS resource indicated by the target SRS resource index, so as to implement uplink beam management on a user equipment side.

Figure 6:
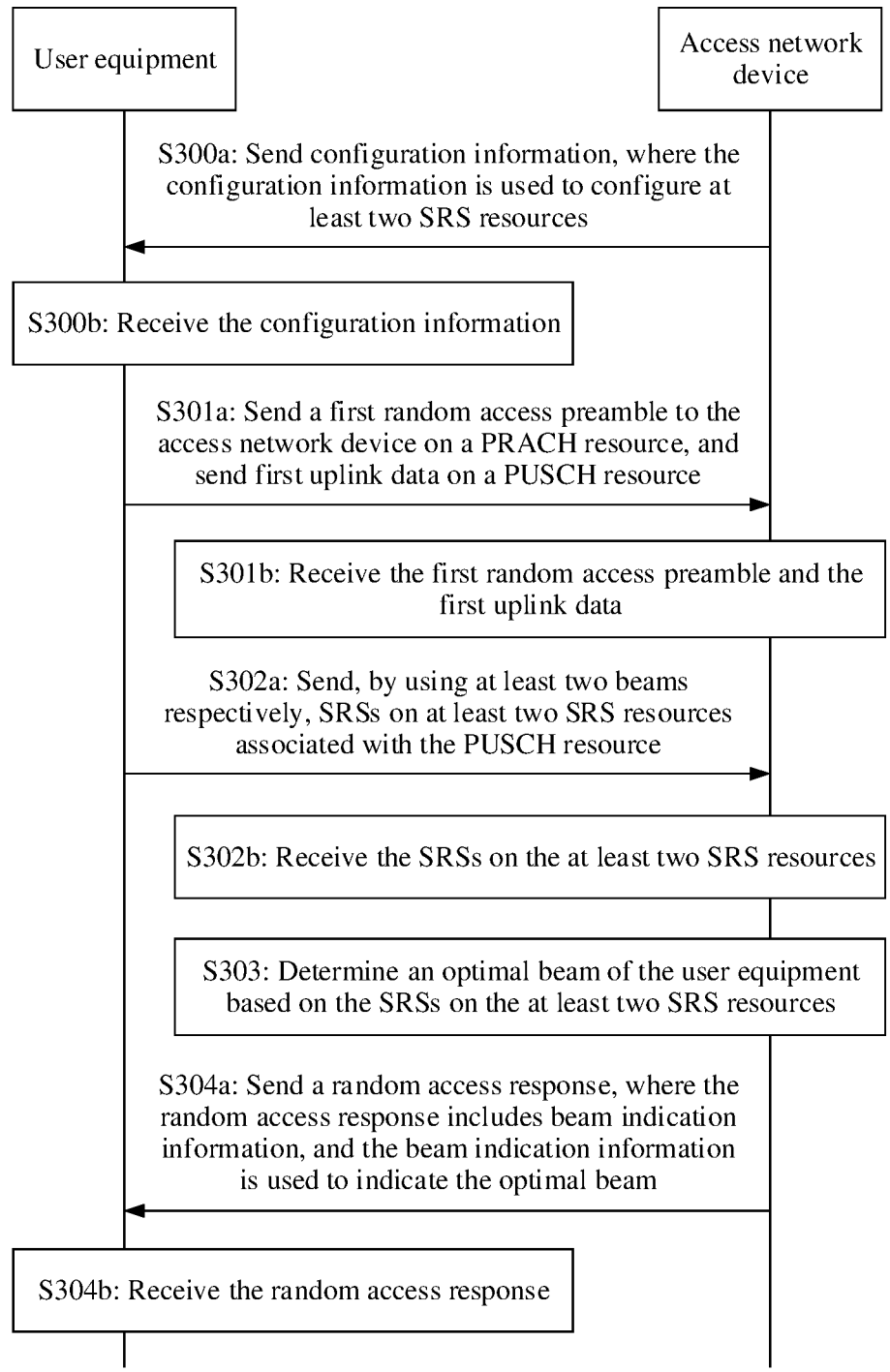
FIG. 6 is a schematic flowchart 2 of an uplink beam management method according to an embodiment of this application.

Further, the at least two SRS resources associated with the PUSCH in S302a may be configured by the access network device for the user equipment. Specifically, as shown in FIG. 6, the method further includes S300a and S300b. S300a and S300b are before S302a, and there may be no sequence between S300a and S300b, and S301a and S301b. In FIG. 6, an example in which S300a and S300b are before S301a and S301b is used for description.

S300a: The access network device sends configuration information to the user equipment, where the configuration information is used to configure the at least two SRS resources.

The access network device may send the configuration information to the user equipment by using broadcast information, to configure and indicate two SRS resources for the user equipment. The configuration information may include at least one of the following information: a quantity of the at least two SRS resources, frequency domain indication information of each of the at least two SRS resources, time domain indication information of each of the at least two SRS resources, or an identity (ID) of an SRS sequence carried on each of the at least two SRS resources.

The time domain indication information of each SRS resource may be used to indicate at least one of the following information of the SRS resource: a time domain start position, a quantity of occupied symbols, or an occupied symbol position. In time domain, each SRS resource may occupy a plurality of consecutive OFDM symbols or may occupy a plurality of discrete OFDM symbols.

In addition, the frequency domain indication information of each SRS resource may be used to indicate at least one of the following information of the SRS resource: a frequency domain start position, a frequency domain bandwidth (namely, an SRS bandwidth), or SRS comb configuration information. The SRS comb configuration information may be used to determine a resource element (RE) that is on the SRS resource and that is used to send an SRS sequence, and the SRS comb configuration information may include a total comb quantity (or referred to as a comb type) and a comb offset value. A comb may mean that REs on the SRS resource are inconsecutive in frequency domain, and are distributed at an equal interval in frequency domain. The total comb quantity may be a quantity of RE sets, in a same frequency band, that are orthogonal in frequency domain and that may be used to map one SRS sequence. The comb offset value may be an index difference between a $1^{st}$ RE corresponding to the SRS sequence and a $1^{st}$ RE in a frequency band in which the SRS resource is located.

Figure 7:
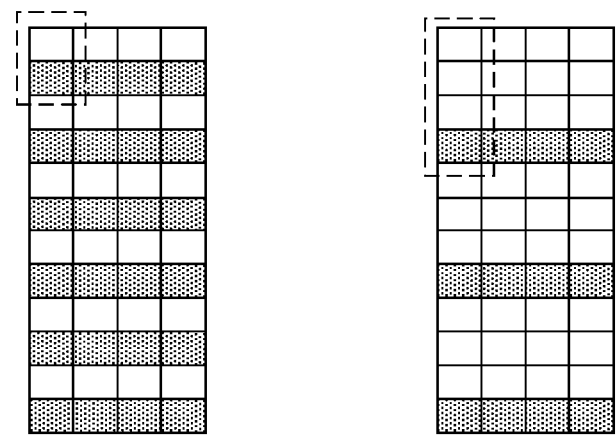
FIG. 7 is a schematic diagram of a total comb quantity according to an embodiment of this application.

For example, as shown in FIG. 7, a case in which the total comb quantity is equal to 2 and a case in which the total comb quantity is equal to 4 are described by using the at least two SRSs shown in FIG. 5, as an example. In FIG. 7, when the total comb quantity is 2, in a same frequency band, there are two RE sets that are orthogonal in frequency domain and that may be used to map one SRS sequence; or when the total comb quantity is 4, in a same frequency band, there are four RE sets that are orthogonal in frequency domain and that may be used to map one SRS sequence. Each small box in FIG. 7 may represent one RE, a range corresponding to a dashed box may be used to represent an RE set corresponding to the total comb quantity, and an RE in which a shadow position is located in FIG. 7 represents a position of a $1^{st}$ RE in the RE set corresponding to the total comb quantity.

Optionally, the SRS comb configuration information may also be predefined. For example, a relationship between the first random access preamble and the SRS comb configuration information is configured for the access network device or the user equipment through predefinition, that is, a relationship between the first random access preamble and an RE that is in the at least two SRS resources and that is used to send the SRS sequence is configured through predefinition. For example, the relationship may be specifically a correspondence between an index of the first random access preamble and an index of the SRS comb configuration information. The SRS comb configuration information may be determined based on the index of the first random access preamble, and then the RE for sending the SRS sequence is determined based on the SRS comb configuration information.

In addition, the ID of the SRS sequence is used to generate an SRS sequence, the ID of the SRS sequence carried on each SRS resource may be used to determine an SRS sequence, and the determined SRS sequence is an SRS sequence corresponding to an SRS sent on the SRS resource. Optionally, the ID of the SRS sequence carried on each SRS resource may also be predefined. For example, a relationship between the first random access preamble and the ID of the SRS sequence is configured for the access network device or the user equipment through predefinition. For example, the relationship may be specifically a correspondence between the index of the first random access preamble and the ID of the SRS sequence. The ID of the SRS sequence may be determined based on the index of the first random access preamble, and then an SRS sequence may be determined based on the ID of the SRS sequence.

S300b: The user equipment receives the configuration information from the access network device, where the configuration information is used to indicate the at least two SRS resources.

When the user equipment receives the configuration information, the user equipment may determine, based on the configuration information, a time domain resource position and a frequency domain resource position that correspond to each of the at least two SRS resources. In addition, the user equipment may further determine, based on the SRS comb configuration information included in the configuration information or the SRS comb configuration information obtained through predefinition, an RE that is on each SRS resource and that is used to send an SRS sequence. In addition, the user equipment may further determine, based on the ID of the SRS sequence included in the configuration information or an ID of an SRS sequence obtained through predefinition, an SRS sequence carried on each SRS resource. Then, the user equipment may send a corresponding SRS sequence at a corresponding position on each SRS resource by performing S302a.

Further, after the user equipment determines the optimal beam, in a subsequent random access process, the terminal may initiate a random access process to the access network device by using the optimal beam. That the user equipment initiates a random access process to the access network device by using the optimal beam may include four different cases, which are separately described in the following.

In a first case, the user equipment sends a second random access preamble only to the access network device by using the optimal beam. In other words, when the user equipment performs a $1^{st}$ step in a four-step random access process, the user equipment performs sending to the access network device by using the optimal beam. In a second case, the user equipment sends second uplink data only to the access network device by using the optimal beam. In other words, when the user equipment performs a $3^{rd}$ step in the four-step random access process, the user equipment performs sending to the access network device by using the optimal beam. In a third case, the user equipment sends the second random access preamble to the access network device by using a beam (for example, a wide beam) different from the optimal beam, and sends the second uplink data to the access network device by using the optimal beam. In other words, when the user equipment performs a $1^{st}$ step in the two-step random access process, the user equipment performs sending to the access network device by using different beams, and the second uplink data is sent by using the optimal beam. In a fourth case, the user equipment separately sends the second random access preamble and the second uplink data to the access network device by using the optimal beam. In other words, when the user equipment performs the $1^{st}$ step in the two-step random access process, the user equipment performs sending to the access network device by using the optimal beam.

For ease of understanding, the PRACH resource, the PUSCH resource, and the at least two SRS resources shown in FIG. 5 are used as an example herein to describe how the user equipment uses the two-step random access process to send the first random access preamble and the first uplink data and send the second random access preamble and the second uplink data.

Figure 8:
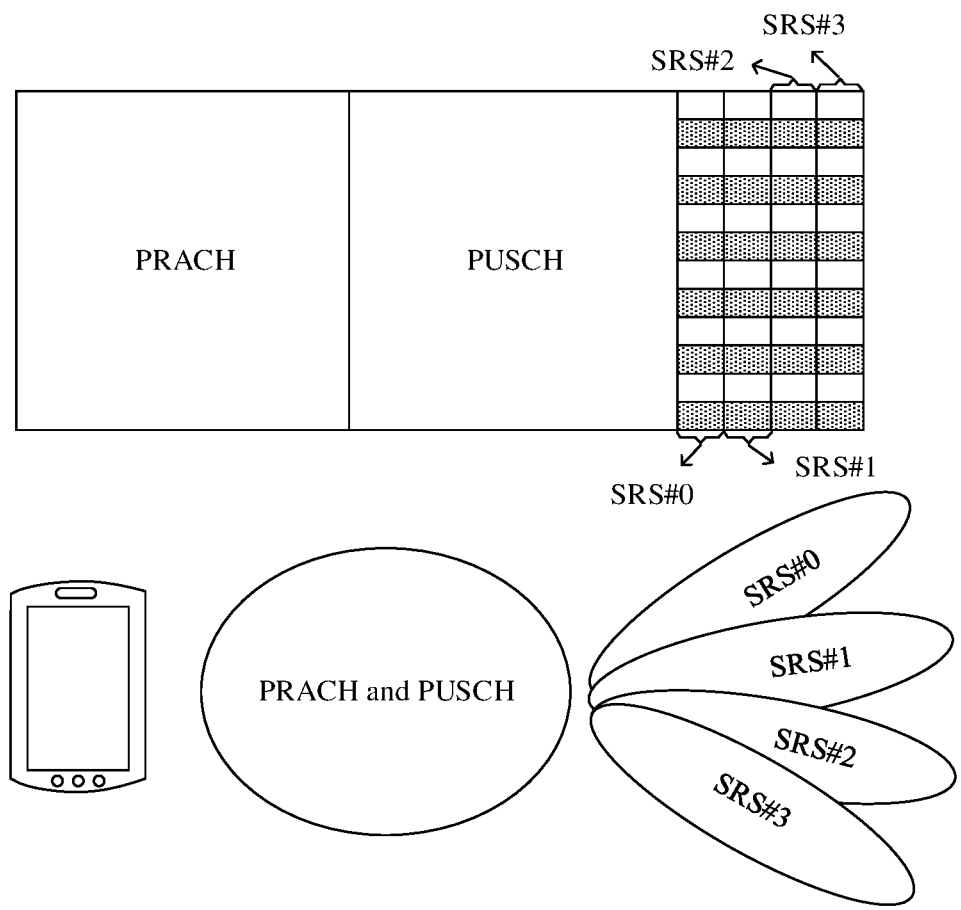
FIG. 8 is a schematic diagram 1 of sending a random access preamble and uplink data according to an embodiment of this application.
Figure 9:
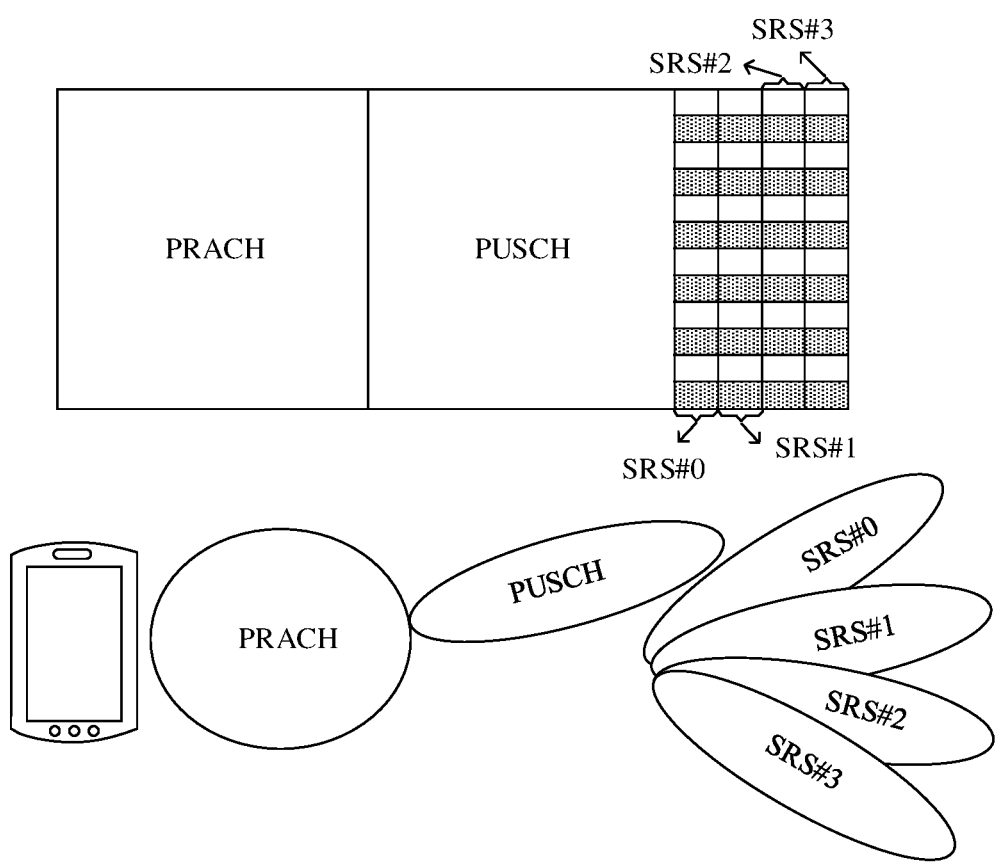
FIG. 9 is a schematic diagram 2 of sending a random access preamble and uplink data according to an embodiment of this application.
Figure 10:
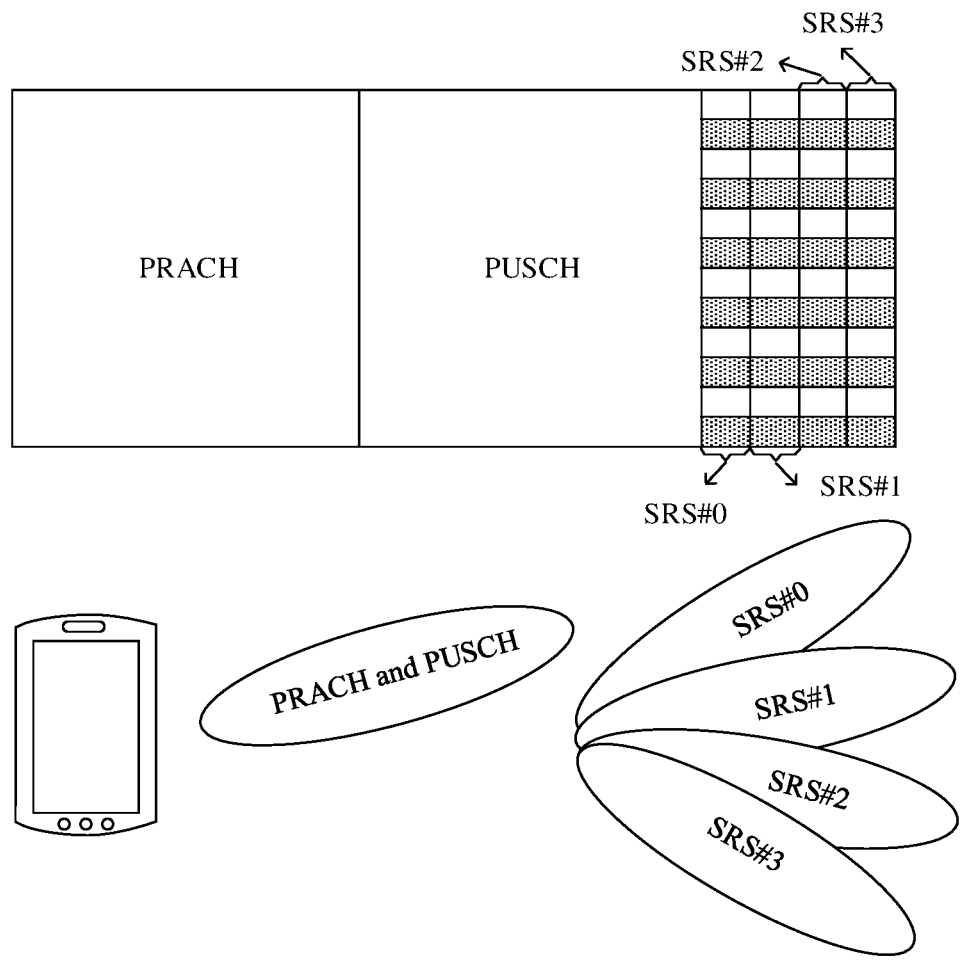
FIG. 10 is a schematic diagram 3 of sending a random access preamble and uplink data according to an embodiment of this application.

As shown in FIG. 8, in the $1^{st}$ step in the two-step random access process, the user equipment may use a wide beam to separately send the first random access preamble on the PRACH resource and send the first uplink data on the PUSCH resource. Then, the user equipment may send the first SRS on the at least two SRS resources by using at least two beams (which may also be referred to as at least two narrow beams) respectively. After the user equipment determines the optimal beam, as shown in FIG. 9, the user equipment may send the second random access preamble by using the wide beam, and send the second uplink data by using the optimal beam. Alternatively, as shown in FIG. 10, the user equipment may separately send the second random access preamble and the second uplink data by using the optimal beam. Further, after sending the second random access preamble and the second uplink data, the user equipment may further continue to send the second SRS on the at least two SRS resources by using the at least two beams respectively.

In the embodiments of this application, when the user equipment is in the RRC idle mode or inactive mode, the user equipment may perform beam sweeping by using the at least two SRS resources associated with the PUSCH resource of random access, and the access network device may indicate the optimal beam by using the beam indication information in the random access response, so that the uplink beam management is implemented for the user equipment in the RRC idle mode or inactive mode, and in addition, a quantity of times of interaction between the user equipment and the access network device can be reduced, and signaling overheads can be reduced. In addition, instead of performing beam sweeping in any process, the user equipment performs beam sweeping by using the at least two SRS resources associated with the PUSCH resource of random access only when the user equipment performs random access. Therefore, power saving can be achieved. In addition, the user equipment sends the SRSs on the at least two SRS resources associated with the PUSCH resource only when the user equipment sends the first uplink data on the PUSCH resource. In this way, interference caused by the SRSs to another user equipment can be reduced.

Figure 11:
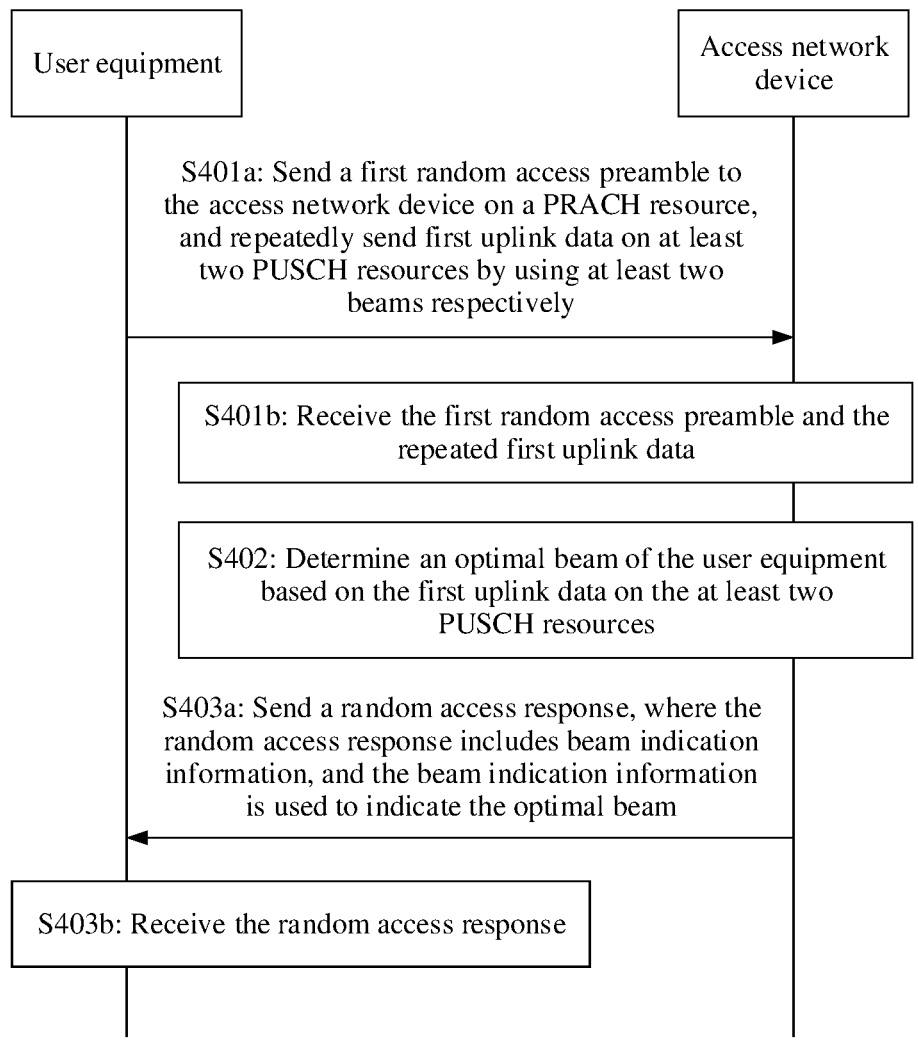
FIG. 11 is a schematic flowchart 3 of an uplink beam management method according to an embodiment of this application.

FIG. 11 is a schematic flowchart of an uplink beam management method according to an embodiment of this application. The method may be used in the communication system shown in FIG. 1. Refer to FIG. 1i. The method includes the following steps.

S401a: When user equipment is in an RRC idle mode or inactive mode, the user equipment sends a first random access preamble to an access network device on a PRACH resource, and repeatedly sends first uplink data to the access network device on at least two PUSCH resources by using at least two beams respectively.

That the user equipment is in the RRC idle mode may mean that no dedicated bearer is established between the user equipment and the access network device, and the user equipment does not store an access stratum context. That the user equipment is in the inactive mode may mean that no dedicated bearer is established between the user equipment and the access network device, but the user equipment stores an access stratum context. When the user equipment is in the RRC idle mode or inactive mode, the user equipment may establish a dedicated bearer with the access network device by using a random access process. The dedicated bearer may be used to perform transmission of unicast data between the user equipment and the access network device.

In addition, the at least two beams may include two or more narrow beams. A narrow beam is relative to a wide beam, and a width of the narrow beam may be less than a width of the wide beam. The at least two beams may be transmit beams of the user equipment, to be specific, the at least two beams are beams used by a user to perform uplink transmission, and may also be referred to as uplink beams.

Figure 12:
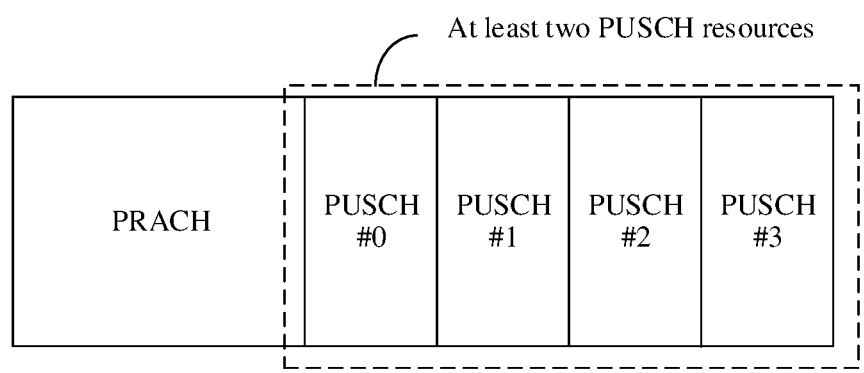
FIG. 12 is a schematic diagram 2 of a resource according to an embodiment of this application.

In addition, the PRACH resource may include a time domain resource and a frequency domain resource that are occupied by a PRACH, and the PUSCH resource may include a time domain resource and a frequency domain resource that are occupied by a PUSCH. For example, the time domain resource may include a plurality of OFDM symbols, and the frequency domain resource may include a plurality of subcarriers. The at least two PUSCH resources may include two or more PUSCH resources. The at least two PUSCH resources may correspond to a same frequency domain resource in frequency domain, and may correspond to different time domain resources (for example, correspond to consecutive time domain resources) in time domain. The PRACH resource and the at least two PUSCH resources may be configured by the access network device for the user equipment. For example, the PRACH resource and the at least two PUSCH resources may be shown in FIG. 12. In FIG. 12, PRACH is used to represent the PRACH resource, and the at least two PUSCH resources include four PUSCH resources, which are respectively represented as PUSCH #0, PUSCH #1, PUSCH #2, and PUSCH #3.

Specifically, when the user equipment is in the RRC idle mode or inactive mode, the user equipment may send the first random access preamble to the access network device on the PRACH resource by using a wide beam, and repeatedly send the first uplink data on the at least two PUSCH resources by using at least two beams (which may also be referred to as narrow beams), that is, send the first uplink data on each PUSCH resource. The first random access preamble and the repeated first uplink data may be sent through one message, to be specific, the first random access preamble and the repeated first uplink data may be sent through a first message in a two-step random access process.

For example, if the at least two beams include a beam c and a beam d, and the at least two PUSCH resources include PUSCH #0 and PUSCH #1, the user equipment may send the first uplink data on PUSCH #0 by using the beam c, and also send the first uplink data on PUSCH #1 by using the beam d.

S401b: The access network device receives the first random access preamble on the PRACH resource, and receives the repeated first uplink data on the at least two PUSCH resources.

When the user equipment sends the first random access preamble and the repeated first uplink data, the access network device may receive the first random access preamble on the PRACH resource, and receive the repeated first uplink data on the at least two PUSCH resources. When the first random access preamble and the repeated first uplink data are sent through the first message in the two-step random access process, the access network device may receive the first message including the first random access preamble and the repeated first uplink data.

S402: The access network device determines an optimal beam of the user equipment based on the first uplink data on the at least two PUSCH resources.

When the access network device receives the first uplink data on the at least two PUSCH resources, the access network device may determine a received power of a first uplink signal on each of the at least two PUSCH resources (where the first uplink signal is an uplink signal corresponding to the first uplink data), and determine, as the optimal beam, a beam corresponding to the first uplink signal whose received power is greater than or equal to a preset power threshold, or determine, as the optimal beam, a beam corresponding to a first uplink signal whose received power is the largest.

Optionally, when there are a plurality of first uplink signals whose received powers are greater than or equal to the preset power threshold, the access network device may select, as the optimal beam, a beam corresponding to any one of the plurality of first uplink signals, or select, as the optimal beam, a beam corresponding to a first uplink signal whose received power has a largest value in the plurality of first uplink signals. For example, the repeated first uplink data on the at least two PUSCH resources includes a first uplink signal #0 and a first uplink signal #1, a received power of the first uplink signal #0 is greater than a received power of the first uplink signal #1, and both are greater than the preset power threshold. In this case, the access network device may select, as the optimal beam, the beam c corresponding to the first uplink signal #0.

It should be noted that the preset power threshold may be preset by a person skilled in the art based on an actual requirement or experience. A specific value of the preset power threshold is not specifically limited in this embodiment of this application. In addition, as an alternative to selecting the optimal beam based on the received powers of the received first uplink signals, the access network device may select the optimal beam based on another parameter of the received first uplink signals, for example, signal strengths of the first uplink signals. This is not specifically limited in this embodiment of this application.

S403a: The access network device sends a random access response to the user equipment, where the random access response includes beam indication information, and the beam indication information is used to indicate the optimal beam.

When the access network device determines the optimal beam, the access network device may include the beam indication information in the random access response. In other words, the access network device may include the beam indication information in a second message in the two-step random access process, to notify the user equipment of the optimal beam by using the beam indication information. Optionally, the beam indication information may be a target PUSCH resource index, and a beam corresponding to a PUSCH resource indicated by the target PUSCH resource index is the optimal beam. Alternatively, the beam indication information may be a target PUSCH repetition index, the target PUSCH repetition index may be an index of a transmission opportunity corresponding to a target PUSCH resource, and a beam corresponding to a PUSCH repetition (namely, the transmission opportunity corresponding to the target PUSCH resource) indicated by the target PUSCH repetition index is the optimal beam. The PUSCH resource indicated by the target PUSCH resource index may be a PUSCH resource selected by the access network device based on a received power, to be specific, a received power of a first uplink signal on the selected PUSCH resource is the largest, or is greater than or equal to the preset power threshold. When there are a plurality of first uplink signals whose received powers are greater than or equal to the preset power threshold, a first uplink signal whose received power has a largest value may be selected.

For example, the user equipment sends the first uplink data on PUSCH #0 by using the beam c, and also sends the first uplink data on PUSCH #1 by using the beam d. A received power of the first uplink signal corresponding to PUSCH #0 is greater than a received power of the first uplink signal corresponding to PUSCH #1, and both are greater than the preset power threshold. In this case, the access network device may select an index of PUSCH #0 as the target PUSCH resource index, and the target PUSCH resource index may be an identifier of PUSCH #0.

S403b: The user equipment receives the random access response from the access network device, where the random access response includes the beam indication information, and the beam indication information is used to indicate the optimal beam.

When the user equipment receives the random access response, the user equipment may determine the optimal beam in the at least two beams based on the beam indication information in the random access response. Optionally, when the beam indication information is the target PUSCH resource index, the user equipment may determine, as the optimal beam, a beam corresponding to a PUSCH resource indicated by the target PUSCH resource index; or when the beam indication information is the target PUSCH repetition index, the user equipment may determine, as the optimal beam, a beam corresponding to a PUSCH repetition indicated by the target PUSCH repetition index, so as to implement uplink beam management on a user equipment side.

Figure 13:
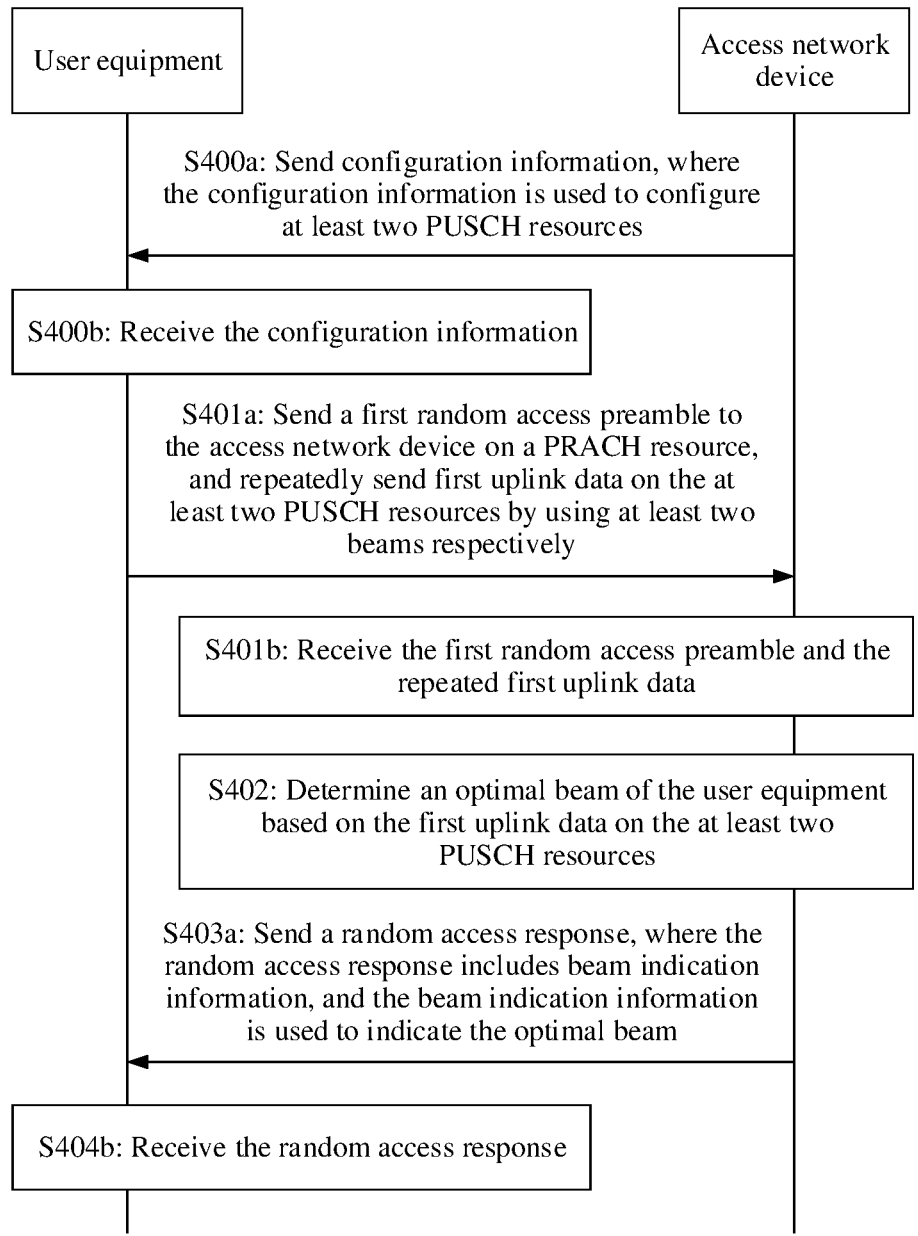
FIG. 13 is a schematic flowchart 4 of an uplink beam management method according to an embodiment of this application.

Further, the at least two PUSCH resources in S401a may be configured by the access network device for the user equipment. Specifically, as shown in FIG. 13, before S401a, the method further includes S400a and S400b.

S400a: The access network device sends configuration information to the user equipment, where the configuration information is used to configure the at least two PUSCH resources.

The configuration information sent by the access network device may include at least one of the following information: a quantity of the at least two PUSCH resources, frequency domain indication information of each of the at least two PUSCH resources, or time domain indication information of each of the at least two PUSCH resources. The time domain indication information of each PUSCH resource may be used to indicate at least one of the following information of the PUSCH resource: a time domain start position, a quantity of occupied symbols, or an occupied symbol position. In time domain, each PUSCH resource may occupy a plurality of consecutive OFDM symbols or may occupy a plurality of discrete OFDM symbols. In addition, frequency domain indication information of each PUSCH resource may be used to indicate at least one of the following information of the PUSCH resource: a frequency domain start position or a frequency domain bandwidth (namely, a PUSCH bandwidth).

S400b: The user equipment receives the configuration information from the access network device, where the configuration information is used to indicate the at least two PUSCH resources.

When the user equipment receives the configuration information, the user equipment may determine, based on the configuration information, a time domain resource position and a frequency domain resource position that correspond to each of the at least two PUSCH resources. Then, the user equipment sends the repeated first uplink data at a corresponding position of each PUSCH resource by performing S401a.

Further, after the user equipment determines the optimal beam, in a subsequent random access process, the terminal may initiate a random access process to the access network device by using the optimal beam. That the user equipment initiates a random access process to the access network device by using the optimal beam may include four different cases, which are separately described in the following.

In a first case, the user equipment sends a second random access preamble only to the access network device by using the optimal beam. In other words, when the user equipment performs a $1^{st}$ step in a four-step random access process, the user equipment performs sending to the access network device by using the optimal beam. In a second case, the user equipment sends second uplink data only to the access network device by using the optimal beam. In other words, when the user equipment performs a $3^{rd}$ step in the four-step random access process, the user equipment performs sending to the access network device by using the optimal beam. In a third case, the user equipment sends the second random access preamble to the access network device by using a beam (for example, a wide beam) different from the optimal beam, and sends the second uplink data to the access network device by using the optimal beam. In other words, when the user equipment performs a $1^{st}$ step in the two-step random access process, the user equipment performs sending to the access network device by using different beams, and the second uplink data is sent by using the optimal beam. In a fourth case, the user equipment separately sends the second random access preamble and the second uplink data to the access network device by using the optimal beam. In other words, when the user equipment performs the $1^{st}$ step in the two-step random access process, the user equipment performs sending to the access network device by using the optimal beam.

For ease of understanding, the PRACH resource and the at least two PUSCH resources shown in FIG. 12 are used as an example herein to describe how the user equipment uses the two-step random access process to send the first random access preamble and the repeated first uplink data and send the second random access preamble and the repeated second uplink data.

Figure 14:
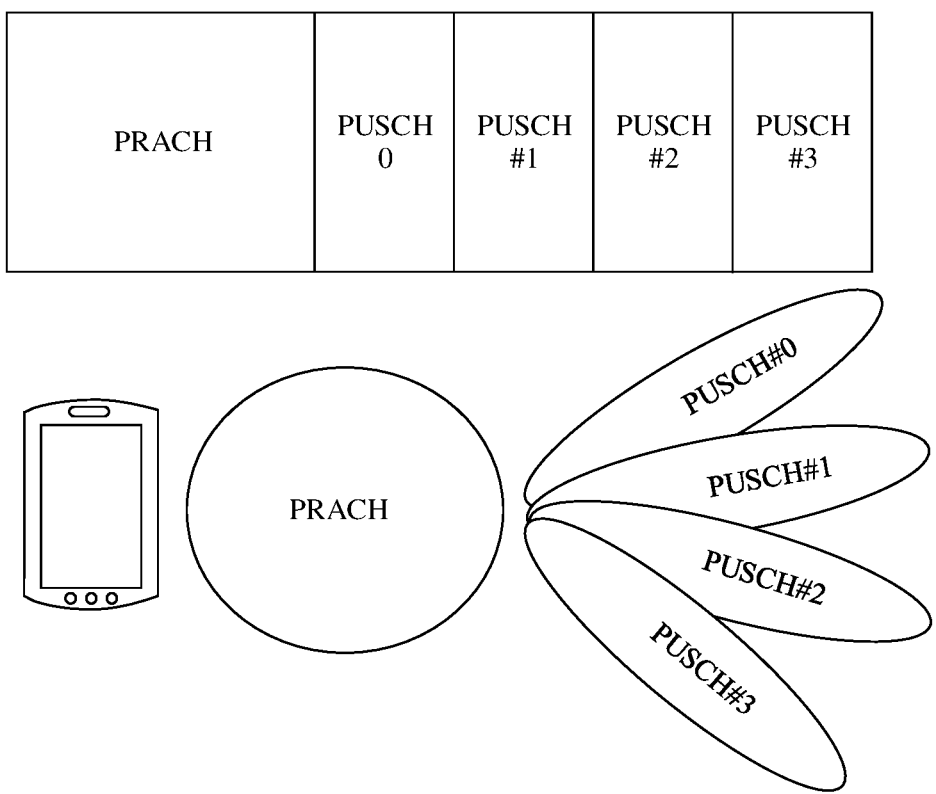
FIG. 14 is a schematic diagram 4 of sending a random access preamble and uplink data according to an embodiment of this application.
Figure 15:
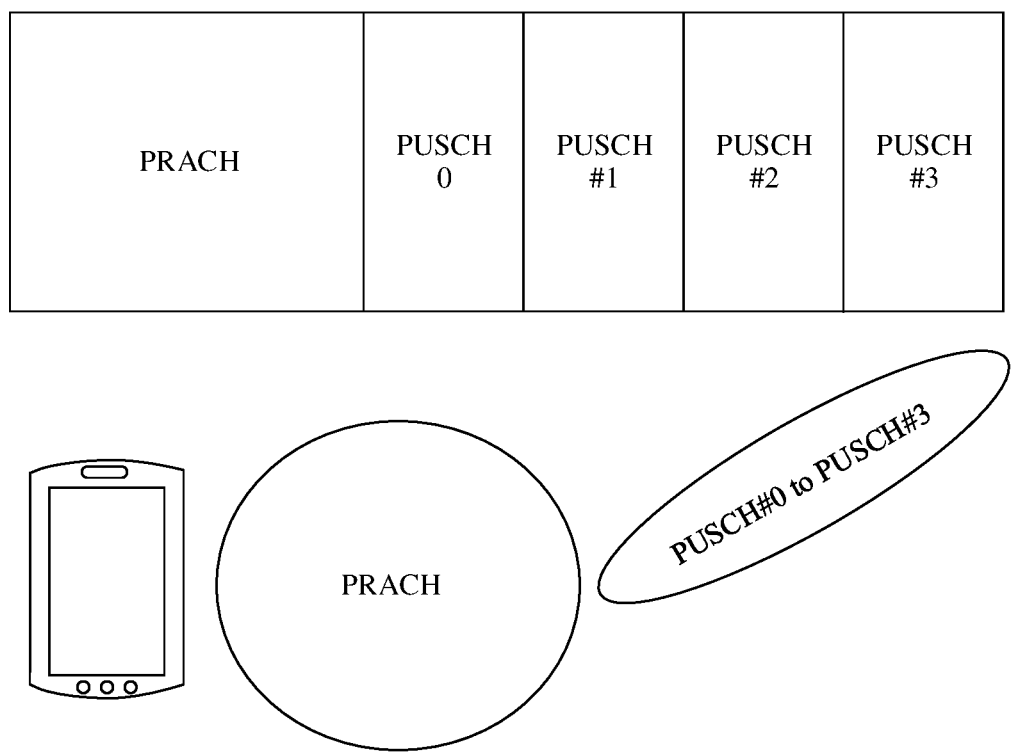
FIG. 15 is a schematic diagram 5 of sending a random access preamble and uplink data according to an embodiment of this application.
Figure 16:
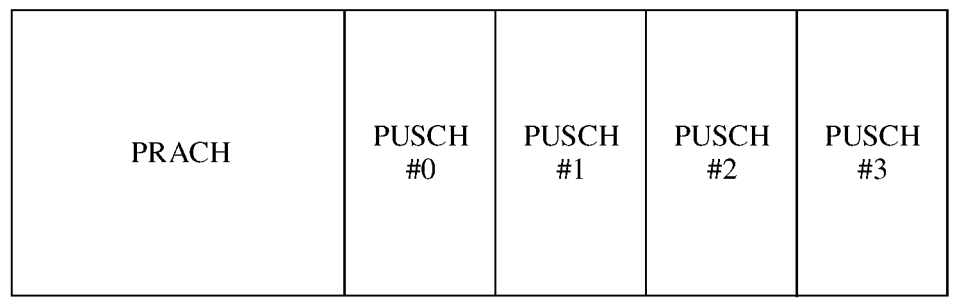
FIG. 16 is a schematic diagram 6 of sending a random access preamble and uplink data according to an embodiment of this application.
Figure 16:
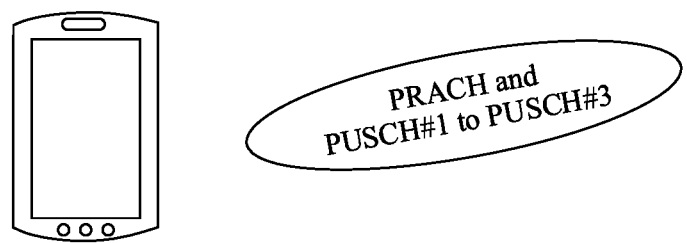

As shown in FIG. 14, in the $1^{st}$ step in the two-step random access process, the user equipment may send the first random access preamble on the PRACH resource by using a wide beam, and send the repeated first uplink data on the at least two PUSCH resources by using at least two beams (which may also be referred to as at least two narrow beams) respectively. After the user equipment determines the optimal beam, as shown in FIG. 15, the user equipment may send the second random access preamble by using the wide beam, and send the repeated second uplink data by using the optimal beam. Alternatively, as shown in FIG. 16, the user equipment may separately send the second random access preamble and the repeated second uplink data by using the optimal beam.

In this embodiment of this application, when the user equipment is in the RRC idle mode or inactive mode, the user equipment may perform beam sweeping by using the at least two PUSCH resources of random access, and the access network device may indicate the optimal beam by using the beam indication information in the random access response, so that uplink beam management for the user equipment in the RRC idle mode or inactive mode is implemented. In addition, instead of performing beam sweeping in any process, the user equipment performs beam sweeping by using the at least two PUSCH resources of random access only when the user equipment performs random access. Therefore, power saving can be achieved.

The foregoing mainly describes the solutions provided in the embodiments of this application from a perspective of interaction between network elements. It may be understood that, the network elements are, for example, the user equipment and the access network device. To implement the foregoing functions, corresponding hardware structures and/or software modules for performing the functions are included in the network elements. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the user equipment and the access network device may be divided into functional modules based on the foregoing method examples. For example, each functional module may be obtained through division based on each corresponding function, or two or more functions may be integrated into one module. The integrated module may be implemented in a form of hardware, or may be implemented in a form of a software functional module. It should be noted that in the embodiments of this application, the division into the modules is an example and is merely logical function division, and there may be another division manner during actual implementation. An example in which each functional module is obtained through division based on each corresponding function is used below for description.

Figure 17:
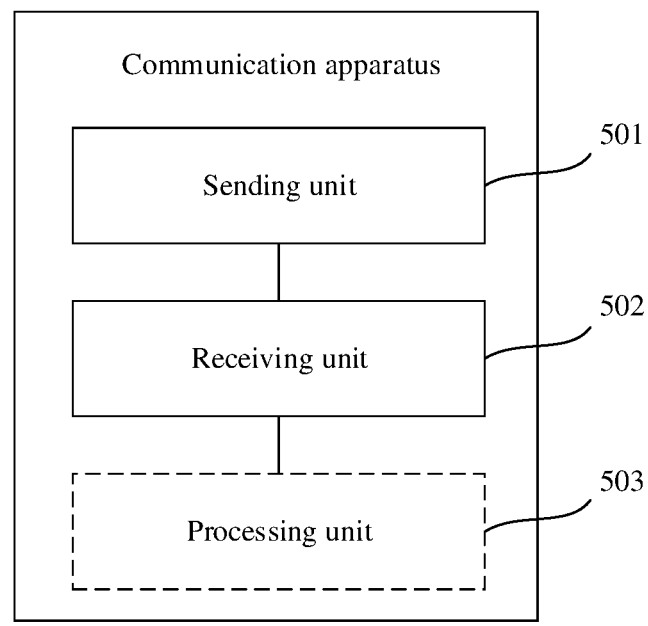
FIG. 17 is a schematic diagram 1 of a structure of a communication apparatus according to an embodiment of this application.

If an integrated unit is used, FIG. 17 shows a schematic diagram of a possible structure of a communication apparatus provided in the foregoing embodiments. The apparatus may be user equipment or a chip built in user equipment. The apparatus includes a sending unit 501 and a receiving unit 502. The sending unit 501 is configured to support the apparatus in performing the foregoing step of sending information to an access network device. The receiving unit 502 is configured to support the apparatus in performing the foregoing step of receiving information from the access network device. Further, the apparatus may further include a processing unit 503. The processing unit 503 is configured to support the apparatus in performing the foregoing information processing step on a user equipment side, and/or another process used for the technology described in this specification.

Optionally, the sending unit 501 is configured to support the apparatus in performing S301a and S302a in the foregoing descriptions, the step of sending the second uplink data to the access network device, and the like. The receiving unit 502 is configured to support the apparatus in performing S304b and S300b in the foregoing descriptions. The processing unit 503 is configured to support the apparatus in performing the foregoing step of determining the optimal beam based on the beam indication information included in the random access response in S304b, and/or another process used for the technology described in this specification. Alternatively, the sending unit 501 is configured to support the apparatus in performing S401a in the foregoing descriptions, the step of sending the second uplink data to the access network device, and the like. The receiving unit 502 is configured to support the apparatus in performing S403b and S400b in the foregoing descriptions. The processing unit 503 is configured to support the apparatus in performing the foregoing step of determining the optimal beam based on the beam indication information included in the random access response in S403b, and/or another process used for the technology described in this specification.

It should be noted that all related content of the steps in the foregoing method embodiments may be cited in function descriptions of corresponding functional modules. Details are not described herein again.

Based on hardware implementation, the processing unit 503 in this application may be a processor of the communication apparatus, the sending unit 501 may be a transmitter of the apparatus, and the receiving unit 502 may be a receiver of the apparatus. The transmitter and the receiver may be usually integrated together to serve as a transceiver. Specifically, the transceiver may also be referred to as a communication interface.

Figure 18:
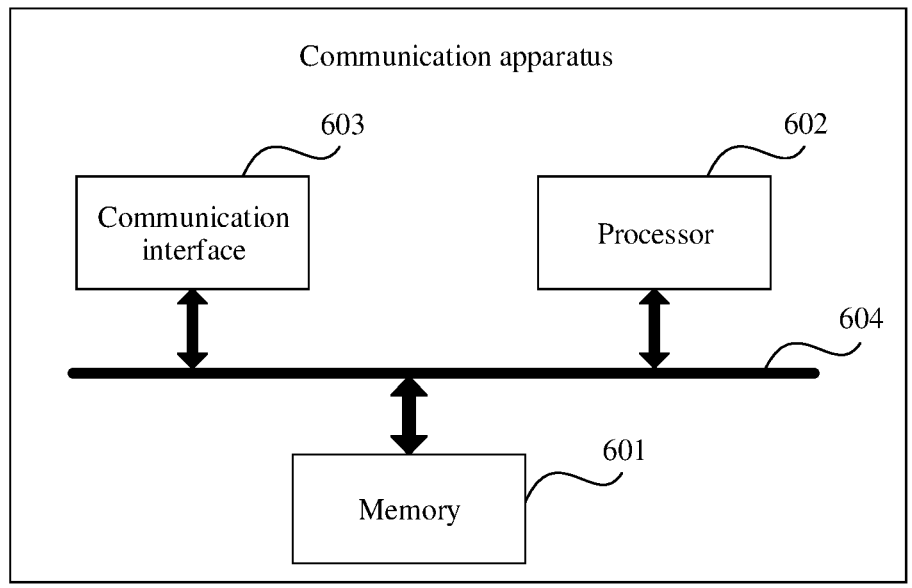
FIG. 18 is a schematic diagram 2 of a structure of a communication apparatus according to an embodiment of this application.

FIG. 18 is a schematic diagram of a possible logical structure of the communication apparatus, provided in the foregoing embodiments, according to an embodiment of this application. The apparatus may be user equipment or a chip built in user equipment, and the apparatus includes a processor 602 and a communication interface 603. The processor 602 is configured to control and manage an action of the apparatus. For example, the processor 602 is configured to support the apparatus in performing the step of determining the optimal beam based on the beam indication information included in the random access response in the foregoing method embodiments, and/or another process used for the technology described in this specification. In addition, the apparatus may further include a memory 601 and a bus 604. The processor 602, the communication interface 603, and the memory 601 are connected to each other through the bus 604. The communication interface 603 is configured to support the apparatus in performing communication, for example, support the apparatus in communicating with the access network device. The memory 601 is configured to store program code and data of the apparatus.

The processor 602 may be a central processing unit, a general-purpose processor, a baseband processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a digital signal processor and a microprocessor. The bus 604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

Figure 19:
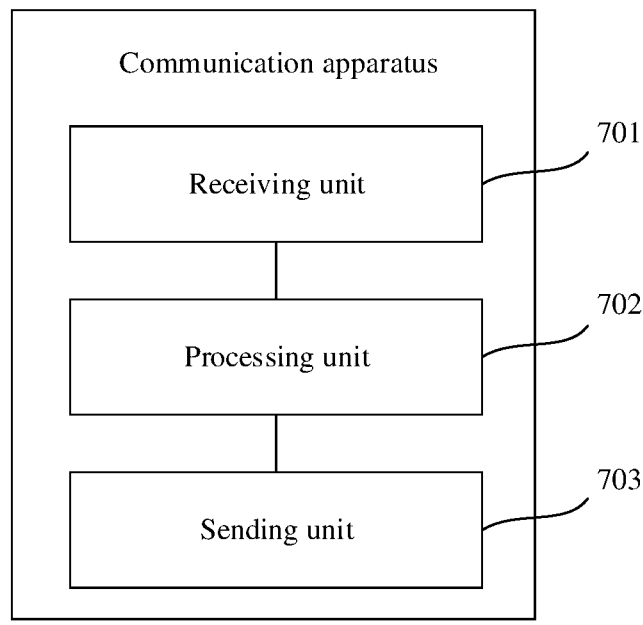
FIG. 19 is a schematic diagram 3 of a structure of a communication apparatus according to an embodiment of this application.

If an integrated unit is used, FIG. 19 shows a schematic diagram of a possible structure of a communication apparatus provided in the foregoing embodiments. The apparatus may be an access network device or a chip built in an access network device, and the apparatus includes a receiving unit 701, a processing unit 702, and a sending unit 703. The receiving unit 701 is configured to support the apparatus in performing the foregoing step of receiving information from the user equipment. The processing unit 702 is configured to support the apparatus in performing the foregoing step of determining the optimal beam of the user equipment by the access network device, and/or another process used for the technology described in this specification. The sending unit 703 is configured to support the apparatus in performing the foregoing step of sending information to the user equipment.

In a feasible embodiment, the receiving unit 701 is configured to support the apparatus in performing S301b and S30ba, the step of receiving the second uplink data from the user equipment, and the like in the foregoing descriptions. The processing unit 702 is configured to support the apparatus in performing S303 in the foregoing descriptions and/or another process of the technology described in this specification. The sending unit 703 is configured to support the apparatus in performing S304a and S300a in the foregoing descriptions. In another feasible embodiment, the receiving unit 701 is configured to support the apparatus in performing S401b, the step of receiving the second uplink data from the user equipment, and the like in the foregoing descriptions. The processing unit 702 is configured to support the apparatus in performing S402 in the foregoing descriptions and/or another process of the technology described in this specification. The sending unit 703 is configured to support the apparatus in performing S403a and S400a in the foregoing descriptions.

It should be noted that all related content of the steps in the foregoing method embodiments may be cited in function descriptions of corresponding functional modules. Details are not described herein again.

Based on hardware implementation, the processing unit 702 in this application may be a processor of the communication apparatus, the receiving unit 701 may be a receiver of the apparatus, and the sending unit 703 may be a transmitter of the apparatus. The transmitter and the receiver may be usually integrated together to serve as a transceiver. Specifically, the transceiver may also be referred to as a communication interface.

Figure 20:
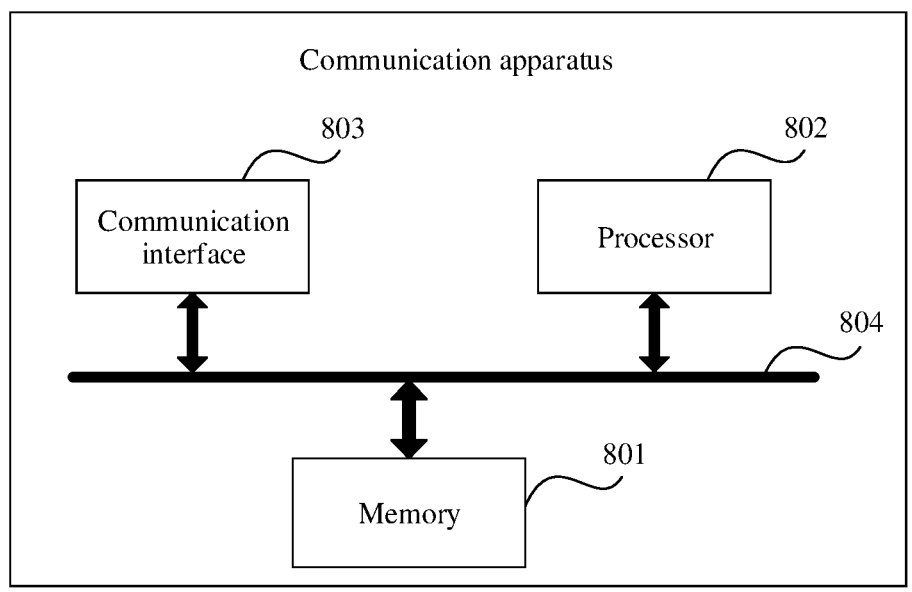
FIG. 20 is a schematic diagram 4 of a structure of a communication apparatus according to an embodiment of this application.

FIG. 20 is a schematic diagram of a possible logical structure of the communication apparatus, provided in the foregoing embodiments, according to an embodiment of this application. The apparatus may be an access network device or a chip built in an access network, and the apparatus includes a processor 802 and a communication interface 803. The processor 802 is configured to control and manage an action of the apparatus. For example, the processor 802 is configured to support the apparatus in performing S303 and S402 in the foregoing method embodiments, and/or another process used for the technology described in this specification. In addition, the apparatus may further include a memory 801 and a bus 804. The processor 802, the communication interface 803, and the memory 801 are connected to each other through the bus 804. The communication interface 803 is configured to support the apparatus in performing communication, for example, support the apparatus in communicating with the user equipment. The memory 801 is configured to store program code and data of the apparatus.

The processor 802 may be a central processing unit, a general-purpose processor, a baseband processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a digital signal processor and a microprocessor. The bus 804 may be a PCI bus, an EISA bus, or the like. The bus may be classified into an address bus, a data bus, a control bus, and the like. For ease of representation, only one thick line is used to represent the bus in FIG. 20, but this does not mean that there is only one bus or only one type of bus.

In another embodiment of this application, a communication system is provided. The communication system includes user equipment and an access network device. The user equipment may be the communication apparatus provided in FIG. 17 or FIG. 18, and is configured to perform a step of the user equipment in the method embodiments provided above. The access network device may be the communication apparatus provided in FIG. 19 or FIG. 20, and is configured to perform a step of the access network device in the method embodiments provided above.

In the several embodiments provided in this application, it should be understood that the disclosed apparatuses and methods may be implemented in another manner. For example, the described apparatus embodiments are merely an example. For example, the division into the modules or units is merely logical function division, and there may be another division manner during actual implementation. For example, a plurality of units or components may be combined, or may be integrated into another apparatus, or some features may be ignored or not performed.

The units described as separate parts may or may not be physically separate, and parts displayed as units may be one or more physical units, may be located in one place, or may be distributed at different places. Some or all of the units may be selected based on an actual requirement to achieve an objective of a solution in this embodiment.

In addition, the functional units in the embodiments of this application may be integrated into one processing unit, or each of the units may exist alone physically, or two or more of the units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. The readable storage medium may include: any medium that can store program code, such as a USB flash drive, a removable hard disk drive, a read-only memory, a random access memory, a magnetic disk, or an optical disc. Based on such an understanding, the technical solutions in the embodiments of this application essentially, or a part contributing to a current technology, or all or a part of the technical solutions may be implemented in a form of a software product.

In another embodiment of this application, a readable storage medium is further provided. The readable storage medium stores computer-executable instructions. When a device (which may be a single-chip microcomputer, a chip, or the like) or a processor executes the computer-executable instructions, a step of the user equipment in the method embodiment provided in FIG. 4 or FIG. 6 is performed.

In another embodiment of this application, a readable storage medium is further provided. The readable storage medium stores computer-executable instructions. When a device (which may be a single-chip microcomputer, a chip, or the like) or a processor executes the computer-executable instructions, a step of the access network device in the method embodiment provided in FIG. 4 or FIG. 6 is performed.

In another embodiment of this application, a readable storage medium is further provided. The readable storage medium stores computer-executable instructions. When a device (which may be a single-chip microcomputer, a chip, or the like) or a processor executes the computer-executable instructions, a step of the user equipment in the method embodiment provided in FIG. 11 or FIG. 13 is performed.

In another embodiment of this application, a readable storage medium is further provided. The readable storage medium stores computer-executable instructions. When a device (which may be a single-chip microcomputer, a chip, or the like) or a processor executes the computer-executable instructions, a step of the access network device in the method embodiment provided in FIG. 11 or FIG. 13 is performed.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs a step of the user equipment in the method embodiment provided in FIG. 4 or FIG. 6.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs a step of the access network device in the method embodiment provided in FIG. 4 or FIG. 6.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs a step of the user equipment in the method embodiment provided in FIG. 11 or FIG. 13.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs a step of the access network device in the method embodiment provided in FIG. 11 or FIG. 13.

Finally, it should be noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A method, comprising:
    receiving, by user equipment, configuration information from an access network device, and using the configuration information to configure at least two sounding reference signal (SRS) resources, wherein the configuration information comprises, for each SRS resource of the at least two SRS resources: frequency domain indication information of the respective SRS resource, time domain indication information of the respective SRS resource, or an ID of an SRS sequence carried on the respective SRS resource;
    while the user equipment is in a radio resource control (RRC) idle mode or inactive mode, sending, by the user equipment, a first random access preamble to the access network device on a physical random access channel (PRACH) resource, and sending, by the user equipment, first uplink data to the access network device on a physical uplink shared channel (PUSCH) resource;
    sending, by the user equipment using at least two beams respectively, SRSs to the access network device on the at least two SRS resources, the at least two SRS resources being associated with the PUSCH resource; and
    receiving, by the user equipment, a random access response from the access network device, wherein the random access response comprises beam indication information, and the beam indication information indicates a selected beam in the at least two beams.

2. The method according to claim 1, wherein each SRS resource of the at least two SRS resources are located after the PUSCH resource in time domain, and a time domain distance between the PUSCH resource and each SRS resource of the at least two SRS resources is less than or equal to a preset distance.

3. The method according to claim 2, wherein the time domain distance between the PUSCH resource and each SRS resource of the at least two SRS resources is zero.

4. The method according to claim 1, wherein the beam indication information is a target SRS resource index, and the method further comprises:
 determining, by the user equipment, as the selected beam, a beam corresponding to an SRS resource indicated by the target SRS resource index.

5. The method according to claim 1, wherein the configuration information further comprises:
 a quantity of SRS resources of the at least two SRS resources.

6. The method according to claim 1, wherein:
 the IDs of the SRS sequences carried on the at least two SRS resources are determined based on the first random access preamble; or
 a resource element (RE) that is in the at least two SRS resources and that is used to send an SRS sequence is determined based on the first random access preamble.

7. The method according to claim 1, further comprising:
 sending, by the user equipment, second uplink data to the access network device using the selected beam.

8. An apparatus, comprising:
 at least one processor; and
 a non-transitory computer-readable storage medium storing instructions that are executable by the at least one processor, the instructions comprising instructions to:
 receive configuration information from an access network device, and use the configuration information to configure at least two sounding reference signal (SRS) resources, wherein the configuration information comprises, for each SRS resource of the at least two SRS resources: frequency domain indication information of the respective SRS resource, time domain indication information of the respective SRS resource, or an ID of an SRS sequence carried on the respective SRS resource;
 while the apparatus is in a radio resource control (RRC) idle mode or inactive mode, send a first random access preamble to the access network device on a physical random access channel (PRACH) resource, and send first uplink data to the access network device on a physical uplink shared channel (PUSCH) resource;
 send, using at least two beams respectively, SRSs to the access network device on the at least two SRS resources, the at least two SRS resources being associated with the PUSCH resource; and
 receive a random access response from the access network device, wherein the random access response comprises beam indication information, and the beam indication information indicates a selected beam in the at least two beams.

9. The apparatus according to claim 8, wherein each SRS resource of the at least two SRS resources are located after the PUSCH resource in time domain, and a time domain distance between the PUSCH resource and each SRS resource of the at least two SRS resources is less than or equal to a preset distance.

10. The apparatus according to claim 8, wherein the beam indication information is a target SRS resource index, and the instructions further comprise instructions to:
 determine, as the selected beam, a beam corresponding to an SRS resource indicated by the target SRS resource index.

11. The apparatus according to claim 8, wherein the configuration information comprises:
 a quantity of the at least two SRS resources.

12. The apparatus according to claim 8, wherein:
 the IDs of the SRS sequences carried on the at least two SRS resources are determined based on the first random access preamble; or
 a resource element (RE) that is in the at least two SRS resources and that is used to send an SRS sequence is determined based on the first random access preamble.

13. The apparatus according to claim 8, wherein the instructions further include instructions to:
 send second uplink data to the access network device by using the selected beam.

14. The apparatus according to claim 8, wherein the time domain distance between the PUSCH resource and each SRS resource of the at least two SRS resources is zero.

15. An apparatus, comprising:
 at least one processor; and
 a non-transitory computer-readable storage medium storing instructions that are executable by the at least one processor, the instructions comprising instructions to:
 send configuration information to user equipment, wherein the configuration information is used to configure at least two sounding reference signal (SRS) resources, wherein the configuration information comprises, for each SRS resource of the at least two SRS resources: frequency domain indication information of the respective SRS resource, time domain indication information of the respective SRS resource, or an ID of an SRS sequence carried on the respective SRS resource, wherein the configuration information comprises a quantity of the at least two SRS resources;
 receive a first random access preamble sent on a physical random access channel (PRACH) resource and first uplink data sent on a physical uplink shared channel (PUSCH) resource, wherein the first random access preamble and the first uplink data are sent by the user equipment when the user equipment is in a radio resource control (RRC) idle mode or inactive mode;
 receive SRSs on the at least two SRS resources, the at least two SRS resources being associated with the PUSCH resource;
 determine a beam of the user equipment based on the SRSs on the at least two SRS resources; and
 send a random access response to the user equipment, wherein the random access response comprises beam indication information, and the beam indication information indicates the determined beam.

16. The apparatus according to claim 15, wherein each SRS resource of the at least two SRS resources is located after the PUSCH resource in time domain, and a time domain distance between the PUSCH resource and each SRS resource of the at least two SRS resources is less than or equal to a preset distance.

17. The apparatus according to claim 16, wherein the time domain distance between the PUSCH resource and each SRS resource of the at least two SRS resources is zero.

18. The apparatus according to claim 15, wherein the beam indication information is a target SRS resource index, and a beam corresponding to an SRS resource indicated by the target SRS resource index is the determined beam.

19. The apparatus according to claim 18, wherein the instructions further comprise instructions to:
- determine a received power of each SRS received on the at least two SRS resources; and
- determine, as the beam, a beam corresponding to an SRS whose received power is greater than or equal to a preset power threshold, or determine, as the beam, a beam corresponding to an SRS whose received power is the largest.

* * * * *